United States Patent [19]
Onuma et al.

[11] Patent Number: 5,938,954
[45] Date of Patent: Aug. 17, 1999

[54] SUBMERGED LASER BEAM IRRADIATION EQUIPMENT

[75] Inventors: Tsutomu Onuma, Hitachi; Toshimi Matsumoto, Hitachinaka; Akira Onuma, Hitachi; Mitsuo Nakamura, Takahagi; Choichi Asano, Hitachi; Yasumasa Tamai, Hitachi; Hiroo Koide, Hitachiota; Masayuki Kurihara, Hitachi; Takao Funamoto, Hitachi; Fuminori Ishikawa, Hitachiota, all of Japan

[73] Assignee: Hitachi, Ltd., Tokyo, Japan

[21] Appl. No.: 08/747,677

[22] Filed: Nov. 12, 1996

[30] Foreign Application Priority Data

| Nov. 24, 1995 | [JP] | Japan | ........................... 7-305905 |
| May 13, 1996 | [JP] | Japan | ........................... 8-117322 |
| Sep. 19, 1996 | [JP] | Japan | ........................... 8-247437 |

[51] Int. Cl.$^6$ ........................... B23K 26/00
[52] U.S. Cl. ........................... 219/121.84; 219/121.6; 219/121.75
[58] Field of Search ........................... 219/121.6, 121.63, 219/121.67, 121.73, 121.75, 121.84

[56] References Cited

U.S. PATENT DOCUMENTS

| 4,151,393 | 4/1979 | Fenneman et al. ................. 219/121.6 |
| 4,491,717 | 1/1985 | Geffroy et al. .................... 219/121.67 |
| 5,356,081 | 10/1994 | Sellar ........................... 219/121.62 X |

FOREIGN PATENT DOCUMENTS

| 0 645 211 A2 | 3/1995 | European Pat. Off. . |
| 0 724 929 A2 | 8/1996 | European Pat. Off. . |
| 4-249799 | 9/1992 | Japan . |
| 6-31479 | 2/1994 | Japan . |
| 7-1171 | 1/1995 | Japan . |
| 7-100673 | 4/1995 | Japan . |
| 7-148593 | 6/1995 | Japan . |
| 7-299574 | 11/1995 | Japan . |
| 8-103882 | 4/1996 | Japan . |

*Primary Examiner*—Gregory Mills
*Attorney, Agent, or Firm*—Antonelli, Terry, Stout & Kraus, LLP

[57] ABSTRACT

A submerged laser beam irradiation equipment provides a high quality submerged laser beam processing of a submerged workpiece using only a small amount of a gas. The submerged laser beam irradiation equipment has: a focus lens for focusing a laser beam; a mirror tube which houses the lens; a first nozzle operating to cover the front end of the mirror tube in an irradiating direction of the laser beam; a skirt portion provided at the front end of the first nozzle for preventing water intrusion thereinto; and a shutter mechanism operable to open and close and provided between said skirt portion and said mirror tube for preventing water intrusion into said mirror tube.

20 Claims, 18 Drawing Sheets

SUBMERGED LASER BEAM IRRADIATION EQUIPMENT

BACKGROUND OF THE INVENTION

The present invention relates to laser beam irradiation equipment, and in particular, it relates to submerged laser beam irradiation equipment capable of expelling water from a space between a submerged laser beam irradiation nozzle and the surface of a submerged workpiece and preventing water intrusion into said space.

Although their heat energy sources may differ, many types of submerged laser beam processing equipment, which process a submerged workpiece by irradiating it with a laser beam to heat and melt the surface of the workpiece, can employ the same localized water repulsion technique which is used in submerged arc welding. According to the conventional localized water repulsion technique, since the presence of any gap between the water repulsion nozzle and the surface of the workpiece will permit water intrusion, a constant mechanical load must be applied to the water repulsion nozzle to maintain it in contact with the surface of the workpiece under pressure so that an air chamber is maintained locally to enable processing under the submerged environment.

Further, equipment is presently in use wherein, by ejecting a fluid or gas along the circumference of the water repulsion nozzle, an air chamber is created which is isolated locally from water intrusion even if there exists a gap between the water repulsion nozzle and the surface of the workpiece, thereby enabling submerged processing.

JP-A-No. 49-98746 discloses a water tight nozzle having a curtain wall including a plurality of curtain members attached around an external circumference of a guide tube for guiding its welding core wire, wherein the plurality of curtain members are arranged densely in contact with each other in a liquid-tight manner and slidably in vertical directions so that each member moves independently in the vertical direction urged by its own weight or under pressure applied externally.

This prior method, however, does not take into account a problem that, since the plurality of curtain members are arranged perpendicular to the surface of the workpiece, there occurs rubbing between the plurality of curtain members and the surface of the workpiece when the torch is moved, thereby bending some of the plurality of curtain members. Further, it does not take into account the problem which occurs when a gap is formed between the curtain members and the surface of the workpiece due to such bending, which allows water intrusion, and the problem that inward bending of the curtain members to the side to which the torch is advancing may cause a short circuit with the arc. Further, according to this prior equipment, during the time the nozzle is maintained in a face down attitude, it is urged into close contact with the surface of the workpiece by its own weight, however, when the nozzle attitude is slanted, a mechanism to press it into contact with the workpiece surface is required.

JP-A-No. 49-023133 discloses a welding torch having a blade runner provided in the outer circumference of a shield gas nozzle, which blade runner is driven at a high speed by a mechanical drive source in order to expel water from a space immediately below the welding torch and the surface of the workpiece to form a vapor phase region to enable submerged welding therein.

According to this prior method, water expulsion is achieved by applying a rotating force to water present around the outer circumference of the nozzle and water present in a gap between the blade runner and the surface of the workpiece. Therefore, it becomes necessary to maintain an appropriate relationship between the gap and the rotating force to balance both lest there should occur water intrusion, as well as to control the gap to be always within a permissible range in order to prevent damage to the surface of the workpiece due to any contact by the surface with the blade runner. Further, occurrence of water intrusion can be expected due to other causes, such as the presence of irregularities on the surface of the workpiece which permit water intrusion through gaps caused by these irregularities immediately below the nozzle, or due to changes in the nozzle attitude to cause it to face upward or sideward, which may also form a gap due to gravity between the upper portion of the blade runner and the surface of the workpiece.

JP-A-No. 7-100673, which relates to submerged laser beam irradiation equipment, discloses a nozzle head having around its annular periphery an annular gas ejector having gas ejection ports for ejecting gas annularly. Gap control between the nozzle head and the surface of a workpiece, which is also required in this prior method, is accomplished by provision of a magnetic wheel which travels by rotating as magnetized. In this case, the workpiece is limited to a magnetic material.

Further, no prior art is known which discloses a method for preventing water intrusion into the nozzle head while the head is moved from the atmosphere to a specific processing position in the water. The prior nozzle has such a structure that, even if water is expelled during submerged welding, when the ejection of the water expulsion fluid is stopped, water intrusion into the welding head cannot be avoided. This disadvantage, which is associated with conventional arc welding, is not limited thereto, but also happens in the case of laser beam welding.

For conventional submerged processing using the above-mentioned submerged laser beam irradiation nozzle, it is required to be able easily to expel water from the nozzle chamber irrespective of the surface condition of the workpiece, such as the presence of irregularities, and of the nozzle attitude during processing. In addition, since the laser irradiation nozzle moves at an arbitrary speed during processing, and thereby a processing area from which water must be expelled will move accordingly, the surface profile, such as irregularities on the workpiece to be irradiated, has a large influence on the effect of water expulsion. Accordingly, there is a need to develop an efficient water expulsion and water immersion prevention method.

In particular, in the case of laser beam irradiation for use in repairing a welded structure or for surface reforming a heat affected zone, the surface of the welded structure typically is not flat, but has irregularities due to the presence of a stepwise portion produced during staggered butt welding, and an angular deformation caused during welding, the removal of excess weld metal and the like. Thereby, provision of an appropriate water expulsion and water immersion prevention method capable of following such irregularities in the surface is required.

A nozzle press-loading method which presses the nozzle against the surface of a workpiece requires a press-loading mechanism, control of the pressing force in compliance with the presence of irregularities, and use of a flexible press contact member at the nozzle end which contacts the surface of the workpiece. In addition, it is also required to strike a balance between the nozzle travel speed and the flexibility of the press contact member. When the pressing force is too large, the friction resistance produced by a convex portion of the irregularities becomes greater, thereby causing the press contact member to bend. When the press contact member is too rigid, there occurs a problem in that the press contact member under pressure does not make good contact with a concave portion of the irregularities.

In the design of a structure capable of preventing water intrusion into the nozzle chamber, it is important, firstly, to prevent such water intrusion into the nozzle chamber while the laser beam irradiation nozzle is being moved the from atmosphere into the water so as to be positioned opposite to a submerged workpiece, and secondly, it is important to water-tightly press the press contact member into contact with the surface of the submerged workpiece having irregularities, while maintaining a constant distance between the nozzle end and an irradiation surface of the workpiece.

It is also necessary to take measures to ensure that a normal laser beam irradiation will be maintained even when prevention of water intrusion into the nozzle chamber fails, for example, by removing a water film or water droplets formed on a lens protection glass provided at the end of the laser beam irradiation unit by injection of a shield gas into the nozzle chamber. Further, it is preferable to use an inert gas as a water expulsion injection fluid in place of air in order to prevent degradation of the water quality.

However, since it is not economical to keep injecting the inert gas from the time the nozzle is submerged, steps must be also taken to minimize the amount of the inert gas to be injected.

Further, in the case of a workpiece which has irregularities on its surface, it is necessary to precisely control the focal point of the laser beam relative to its surface profile while the nozzle head travels. In particular, it is important to hold the nozzle at a constant focal distance when carrying out welding or surface reforming using a small input of heat in order to assure the quality of the irradiated portions. Further, since injection of a large amount of water expulsion fluid in a closed chamber, such as a tower, vessel and the like, will change the water quality, minimization of such fluid injection must also be considered as described above.

Still further, in the case where a high power laser beam is used for a long duration, and where its mirror tube is comprised of an optically opaque metal, such as copper and aluminum alloy, heat due to the laser beam will be absorbed by the mirror tube material and will accumulate therein even though submerged in water, thereby gradually increasing its temperature. Generally, a laser beam optical system comprises precision components, such as a plurality of lenses and a mirror tube for housing the lenses. The sizes of these precision components will change in response to a temperature change. Since even a small change in size will cause the focal point of the laser beam to alter greatly, the result will be an unstable weld quality due to changes in the depth of fusion or the width of the welding. Further, in the case of laser beam cutting, the result will be a change in the cutting width and an irregular cutting surface.

SUMMARY OF THE INVENTION

The present invention has been developed to solve the above-mentioned problems associated with the prior art. The object of the invention is to provide submerged laser beam irradiation equipment capable of performing a high quality laser beam machining using only a small amount of gas in a water environment.

A laser beam irradiation equipment provided for accomplishing the above-mentioned object of the invention, which uses a laser beam to heat and fuse the surface of a submerged workpiece, is comprised of a shield gas piping; a gas pressure control means; a plurality of thin wires which are slidably movable with respect to each other, made of metal or non-metallic fibers arranged in a water-tight manner with a taper spreading outwardly on an outer circumference of a shield gas injection nozzle, which is coupled to a laser beam irradiation tube so as to expel water from an irradiation surface, as well as to prevent water intrusion thereinto; and a blade runner holding the plurality of thin wires provided within the shield gas nozzle, wherein the blade runner is rotated by a flow caused by injection of a shield gas, thereby causing the plurality of thin wires, while in rotation, to slidably protrude continuously into contact with the irradiated surface of the workpiece, thereby to seal a gap between the shield gas injection nozzle and the irradiation surface of the workpiece in a water-tight manner, thereby expelling water and preventing water intrusion therethrough. In addition, rotation of the plurality of thin wires in contact with the irradiated surface will be effective for removing foreign matter deposited thereon.

As described above, with use of the irradiation equipment of the invention, the plurality of thin wires provided on the outer circumference of the shield gas injection nozzle coupled to the laser beam irradiation tube is effective to shield the gap between the shield gas injection nozzle and the irradiated surface by action of their contact and rotation, and advantageously expels water and prevents water intrusion, thereby enabling an improved submerged laser beam irradiation. Further, since a shield gas is injected forcibly in a circumferential direction by rotation of the blade runner, water intrusion from the upper side of the nozzle can be prevented at the time when the laser beam is irradiated in a horizontal direction, thereby enabling laser beam machining independently of the nozzle attitude.

The invention intentionally makes use of the centrifugal force generated by the rotation, and since, in the case of laser beam irradiation, an excessive shield gas flow will not prevent optimal machining, use of the rotation effect produced by this shield gas has been adopted. With reference to FIG. 15, a schematic diagram of a shield gas injection nozzle arrangement according to the invention is shown. When a frame 42 which accommodates a thin wire 41 slanted outwardly at angle θ° is rotated by a motor 67, the thin wire 41 tends to expand outwardly in response to the centrifugal force of rotation.

Thin wire 41 is inserted into a groove 43 in frame 42 from its one end. The thin wire 41 is provided with a protrusion 44 at its one end and with a protrusion 45 at its other end, which prevents it from springing out of the groove 43. According to this arrangement, thin wire 41 is caused to protrude both in an axial direction of rotation and in a direction perpendicular to the axial direction of rotation. By appropriately selecting the length of the thin wire 41, and by disposing it so that the irradiated surface 46 extends in a protruding direction of the thin wire 41, it can be ensured that the thin wire 41 will always be in contact with the irradiated surface 46.

Further, provision and rotation of a plurality of such thin wires 41, which are arranged around the periphery of the nozzle, will provide a continuous water tight contact with the irradiated surface 46 having irregularities, thereby making it possible to shield any gap between the nozzle and the irradiated surface. Further, rotation of the plurality of thin wires 41 will serve as a water tight shielding by itself, thereby preventing water intrusion. Thereby, water tight shielding becomes possible irrespective of the surface profile of the irradiated surface 46.

Although the frame 42, which holds the plurality of thin wires 41, can be rotated by a motor or the like, it can be rotated also by use of the shield gas which is injected for water expulsion and water intrusion prevention. FIG. 6 is a schematic diagram of laser beam irradiation equipment having a shield gas injection nozzle for use in water. A laser beam irradiation optical component 52 is fixed to an arm 62 which is coupled to a traveling stage 63.

FIG. 8(a) is a longitudinal cross-sectional view of the laser beam irradiation optical component 52 of FIG. 6. Laser beam optical component 52 is comprised of a laser beam irradiation tube 51, which contains a focus lens 54, and a shield gas injection nozzle 48. A shield gas is supplied from a gas supply source 57 (FIG. 6) through a pressure control unit 58 and a gas supply line 59 to a shield gas supply port 56, so as to be injected into the injection nozzle 48. Likewise, a center flow of gas is supplied also from the gas supply source 57 through gas pressure control unit 58 to a center gas supply port 55 so as to be injected into a conical chamber 50.

A laser beam 66 is transmitted via optical fiber 61 from a laser beam oscillator 60, and enters a laser beam irradiation tube via a fiber coupler 70. With movement controlled by the travelling stage 63, laser beam irradiation unit 52 travels along a surface 46 submerged in a water tank 65, thereby enabling submerged laser beam irradiation. FIG. 7 shows the structure of the gas injection nozzle 48 of the invention. The gas injection nozzle 48 houses bearing 49 for rotatably supporting the frame 42.

Blade runner 47, as seen more clearly in FIG. 8(b), is disposed inside the frame 42 and is coupled thereto. The frame 42 is fixed via the bearing 49 to the gas injection nozzle 48. A shield gas flow supplied through the shield gas supply port 56 will provide the blade runner 47 with the necessary torque to rotate the frame 42, which is coupled to the blade runner 47, thereby providing a centrifugal force to the plurality of thin wires 41.

According to the above-mentioned method of the invention, the rotating means required therefor can be simplified, and since the shield gas is injected spirally, it is possible to expel water uniformly along the whole circumference of the shield gas injection nozzle and to prevent water intrusion therethrough. Further, rotation of the plurality of thin wires 41 in contact with the surface of the workpiece 46 will effectively remove foreign matter, such as oxide scale, from the irradiation surface 46, and still further, since the shield gas is injected uniformly along the whole circumference of the shield gas injection nozzle 48, it is possible to prevent ingress of any foreign matter onto the irradiation surface 46 immediately below the nozzle 48.

A modified version of the aforementioned nozzle structure, in which the blade runner 47 is disposed at the front end of the shield gas injection nozzle 48, so as to be rotated by injection of the shield gas, will also provide the same advantage and effect. Here, a plurality of thin wires 41 disposed at the front end of the blade runner 47 are slidable one over another in vertical directions, these thin wires 41 being made of metallic or non-metallic fibers and being disposed with a slant angle spreading from the shield gas injection nozzle. Thin wires 41 are provided with a spherical protrusion 44, 45 at each end in order to prevent them from springing out of the blade runner 47 and also to facilitate slidable movement outward in response to centrifugal force. Slidable movement of thin wires 41 actuated by the centrifugal force produced by rotation of blade runner 47 will continuously shield a gap between the nozzle and the irradiated surface 46, thereby expelling water and preventing water intrusion.

Further, according to the above-mentioned arrangement of the invention whereby the plurality of thin wires 41, while in rotation, are made to contact the irradiated surface 46 flexibly, it becomes possible to perform omnidirectional welding, such as vertical welding and horizontal welding, independent of angular orientation of the irradiation nozzle.

Further, submerged laser beam irradiation equipment for processing a surface of a workpiece by irradiating it with a laser beam in water according to another aspect of the invention for accomplishing the above-mentioned object is characterized by the fact that it comprises integrally a mirror tube which holds a laser beam irradiation means, the front face of which is sealed, a first nozzle disposed to cover the front face of the mirror tube, a closure means which is closable for preventing water intrusion into the first nozzle, a first gas supply means for supplying a gas into the first nozzle, and an actuating means for actuating the above-mentioned closure means, wherein, prior to laser beam irradiation, the aforementioned gas is supplied into the first nozzle and the aforementioned closure means is opened, and, at the time of no laser beam irradiation, the aforementioned closure means is closed to prevent water intrusion into the first nozzle.

It is preferable for this submerged laser beam irradiation equipment to have a pressure detection means for detecting the water pressure at a position of the first nozzle and a pressure control means for controlling the pressure of a gas to be injected into the first nozzle in accordance with the detected water pressure.

Further, it is also possible to modify the aforementioned submerged laser beam irradiation equipment further to include a second nozzle for water expulsion which is disposed concentrically and is integral with the first nozzle at the front end thereof; a second gas supply means for supplying a gas into the second nozzle; a support means which presses the first nozzle and the second nozzle against the irradiated surface with an arbitrary load; and an adjusting means for adjusting the pressure and flow rate of the gas to be injected from the second nozzle, whereby the pressure and flow rate of the gas injected from the second nozzle is adjusted by the adjusting means so as to balance with the supporting pressure of the support means, thereby making it possible to maintain a constant optical distance between the second nozzle and the irradiated surface.

In this case, the second nozzle may be comprised of a blade runner, which is rotated to produce a gas phase, for example, within the blade runner so as to prevent water intrusion through the gas phase. Further, it is preferable for the second gas supply means to be controlled independently of the first gas supply means.

Further, it is also possible to modify the nozzle structure to have a water curtain disposed concentrically and to be integral with the first nozzle at its front end, a support means for press-supporting the first nozzle to the irradiated surface with an arbitrary load, and an adjusting means for adjusting the pressure and flow rate of the gas to be injected from the gas supply means, whereby the aforementioned adjusting means adjusts the pressure and flow rate of the gas to be injected into the first nozzle so that an adjusted gas injection pressure at the nozzle end prevents water intrusion into the water curtain. In this case, the water curtain may be comprised of a brush or a bundle of fabric.

Still further, it is also possible to provide a blade runner disposed inside or outside of the water curtain, with the blade runner being rotated by injection of a gas through the first nozzle to form a gas phase region which prevents water intrusion therethrough.

Furthermore, it is also possible to fabricate the above-mentioned closure means to have a plurality of blades and a mechanism whereby the plurality of blades can be opened concentrically through an interlocking action of the blades. The above-mentioned mechanism causes the blades to close during no laser beam irradiation so as to allow a gas pressure within the nozzle chamber to prevent water intrusion thereinto, and causes the blades to open and a gas to be inspected prior to the start of laser beam irradiation in order to prevent water intrusion thereinto.

Further, it is also possible to fabricate the aforementioned closure means so as to have a nozzle made of an elastic material, and to fabricate the aforementioned actuating means to have a clamp mechanism to clamp a front end of the nozzle, whereby, when there is no laser beam irradiation, the aforementioned closure actuating means causes the clamp mechanism to clamp the nozzle front end to prevent water intrusion therethrough, and, during laser beam irradiation, the aforementioned clamp mechanism is actuated by the pressure of gas injection to open the nozzle front end and at the same time the gas is injected in order to prevent water intrusion.

Still further, the above-mentioned closure means may be comprised of a round bar having a hole penetrating from one side to the other side thereof in a direction perpendicular to its axial line, which is disposed orthogonal to a longitudinal direction of the first nozzle front portion, and the aforementioned closure actuating means is comprised of a rotating mechanism which rotates the round bar around the axial line thereof, whereby, during non laser beam irradiation, the closure actuating means rotates the round bar to close its hole thereby to isolate the first nozzle chamber from the outside, and, during laser beam irradiation, the pressure of a supply gas is increased prior to laser beam irradiation while the round bar is rotated to open its hole to the gas flow thereby to allow the gas to be injected from the first gas nozzle to prevent water intrusion.

Further, the aforementioned closure means may be comprised of a sealing plate disposed at the front end of the first nozzle and slidable in a direction perpendicular to the longitudinal direction of the first nozzle, and the aforementioned closure actuating means may be comprised of a mechanism which moves the sealing plate in a direction perpendicular to the longitudinal direction of the first nozzle, whereby, during non laser beam irradiation, the closure actuating means slidably closes the sealing plate to prevent water intrusion, and, during laser beam irradiation, the pressure of the gas supply is increased prior to irradiation and the sealing plate is moved to allow the first nozzle front end to open to enable gas injection therethrough and thereby prevent water intrusion.

Still further, the arbitrary load of the aforementioned support means can be preset at a value which ensures a predetermined gap to be maintained between the irradiation surface and the nozzle front end disposed opposite thereto.

Further, the laser beam irradiation equipment provided in order to accomplish the above-mentioned object of the invention comprises a laser beam irradiation mirror tube, at least a part of which is made of an optically transparent material. The optically transparent material includes any material having an optical transmittancy over 50%, and preferably over 80% in the visible spectrum. However, since the object of the invention resides in the prevention of a temperature rise in the mirror tube which can be realized by transmitting exothermic rays produced by the laser beam to the outside, a material having an optical transmittancy less than 50% in the visible spectrum may be adopted as well, provided that it can transmit infrared rays which occupy most parts of the generated heat rays.

What is meant by at least a part of the mirror tube being comprised of an optically transparent material in the preceding paragraph corresponds to a case where a part of a conventional mirror tube made of copper, which is optically opaque, is replaced by an optically transparent material which, if its mechanical strength is not sufficient, is held in a reinforcement window beam structure made of metal. If the mechanical strength of the transparent material is sufficient, for example, when a quartz glass or a high-content silica glass is used, the whole body of the mirror tube may be made of such an optically transparent material. The mirror tube is arranged to enable its focusing lens to focus a laser beam into an optimal beam size. That is, since the key point here is to be able to maintain a constant focus distance, a cross-sectional profile of the mirror tube in a direction perpendicular to the direction of the laser beam may have any shape either of a circle, polygon, or ellipse.

Further, it is preferable for at least a part of the above-mentioned injection nozzle to be made of an optically transparent material. When the injection nozzle is made of an opaque material, its temperature rises substantially. Since the injection nozzle is connected to the mirror tube, when the temperature of the nozzle rises, the temperatures of the mirror tube and its lens are caused to rise by heat conduction. As a result, the focal point is caused to drift similar to the case described above. That is why at least a part of the nozzle is preferably made of an optically transparent material to facilitate heat dissipation therethrough. In view of the structural strength to be ensured, it would be sufficient for at least a part of the nozzle to be made of an optically transparent material. What structure is to be employed depends on the type of laser being used, its output power, the transparent material being used, and the like. Since the subject invention is directed to the prevention of drift or fluctuation of the focal point of a laser beam due to a temperature rise, this object of the invention can be accomplished by making either one of the mirror tube and the injection nozzle, or both of them, and at least a part of them, of an optically transparent material. It becomes possible through use of an injection nozzle made of an optically transparent material to ascertain in-situ the quality of a laser beam machined part during its laser beam irradiation machining, namely, allowing clear in-situ inspections of reflected light of a laser beam within the nozzle or of an exothermic ray from a molten metal, thereby facilitating a rapid response to any abnormality during irradiation processing. Thereby, a highly reliable and improved quality laser beam welded part or laser beam machined part can be obtained. Further, it becomes possible according to the invention to precisely detect any abnormality from a glow condition in a reflected light from the irradiation surface or in a laser beam output, and so, it is also possible to convert an optical signal indicative of the quantity of light in this luminous phenomenon to an electric signal, to analyze the signal in-situ and transmit a signal to the oscillator to control or interrupt the laser output instantly.

An optically transparent material comprises at least one material selected from the group of ceramics, glass, crystallized glass, quartz and synthesized resins. Though it seems apparently opaque and has a low transmittancy in the visible spectrum, crystallized glass has a high transmittancy in an infrared region, and so, it can be used in the mirror tube and the nozzle of the invention as well. Moreover, since the crystallized glass has the advantage of an excellent strength and heat resistance, it is more preferable as a material for the subject invention. In a glass material for use in the subject invention, it is preferable to have a silicon oxide as a base material with addition of trace elements of sodium, calcium, lanthanum, zirconium and the like to be mixed therein so as to adjust its transmittancy, strength and thermal expansion coefficient. Pyrex glass, which contains a boron additive, is also suitable for use in the subject invention. As ceramic materials, a transparent aluminum oxide, magnesium oxide, zirconium oxide and the like can be used. These materials, however, have a disadvantage that their transmittancies in the visible region are low. Quartz which has an excellent strength and light transmittancy, however, it has a drawback in that it is costly. Quartz can be formed into any shape required for a mirror tube or nozzle, if it is made from a molten quartz. Further, these materials can be used in combination. For example, it is preferable for the material for use in the nozzle to have a high melting point and still to be economical, since its surface is likely to be stained with sputtering of molten metal during welding. Thereby, the nozzle may be made of a crystallized glass or the like, and the mirror tube, which preferably is made of a material having a high rigidity, and is not likely to be replaced often, may be made of a transparent ceramic material. Further, in the same nozzle, it is possible selectively to use a very high heat resistant material in a part thereof where its temperature rise is very high, and a medium heat resistance material in a part thereof where its temperature rise is not so severe. Through such selection of materials and optimal arrangements, there can be provided laser beam irradiation equipment which features an improved cost performance.

It is preferable for an optically transparent material for use in the subject invention to be coated with a non-reflective coating on its surface. It is desirable for a heat ray from the laser beam to pass through the transparent material and dissipate out of the mirror tube or the injection nozzle. However, if the heat ray is reflected from the inner wall within the chamber of the laser beam irradiation, the heat cannot be removed sufficiently, with the result that the temperature therein will increase. Thereby, through provision of a coating to minimize reflectivity on the surface of the transparent material, it becomes possible to minimize the temperature rise. As such non-reflective coating, a multi-layered inorganic thin film of conventional titanium oxide, silicon oxide and the like can be used after adjusting its film thickness and components such that the least reflectivity is obtainable in a wavelength region of the laser beam being used.

Through such provision of a coating according to the invention as described above, the temperature rise in the mirror tube and the nozzle can be further reduced.

Since a temperature rise in a portion of the mirror tube in the closest proximity to the laser beam is greatest, it is possible for only this portion of the mirror tube to be comprised of a transparent material, and an external tube portion disposed external to the mirror tube for cooling the mirror tube portion may be comprised either of a transparent and opaque material. In this case, an inert gas is circulated between the mirror tube and the external tube to increase the cooling effect.

The mirror tube and the nozzle according to the invention, as described above for use in the laser beam irradiation equipment, will cause no drift in the focal point even if it is operated for an extended period of time, allowing it to be operated continuously to ensure a high machining precision.

The laser beam irradiation equipment as described above can be applied to any laser beam irradiation equipment using a YAG laser, $CO_2$ laser, excimer laser or the like. Further, application of this equipment of the invention to laser beam welding equipment, laser beam cutting equipment, laser beam surface treatment equipment or the like, which have a laser beam irradiation unit, will make it possible for high precision welding and a high precision machining to be implemented. Still further, since a change in focal point is minimal even after long duration operation, thereby ensuring a high precision laser beam irradiation, the invention can be applied to laser beam irradiation equipment for use in lithography and the like as well.

DETAILED DESCRIPTION OF THE PREFERRED EMBODIMENTS

Figure 1:
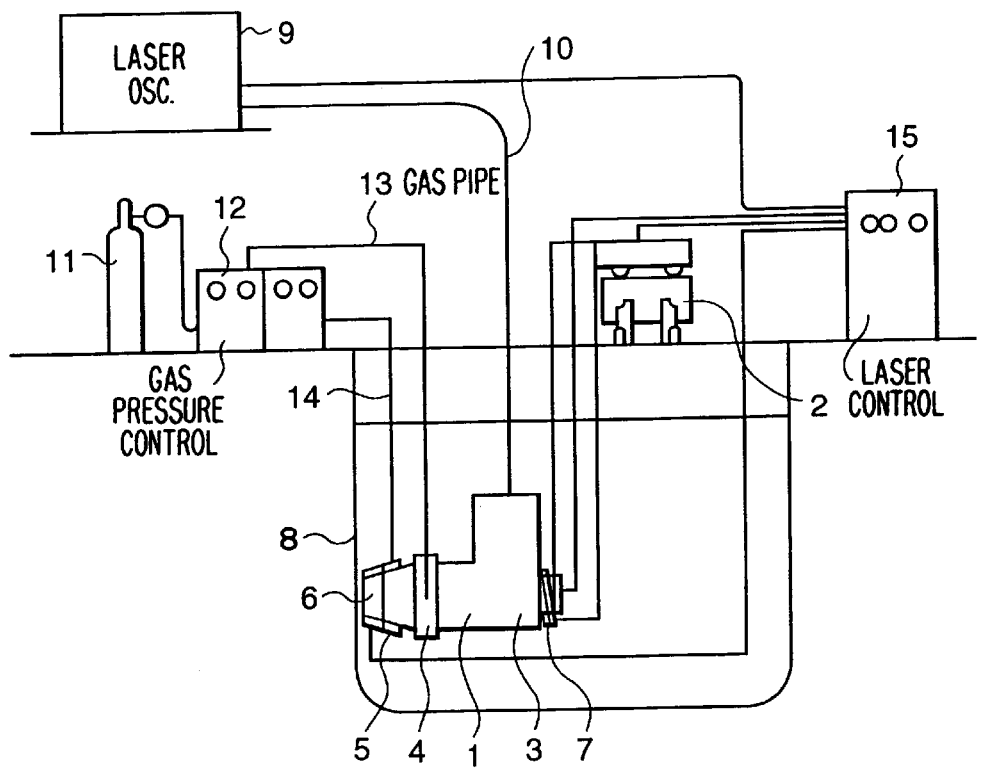
FIG. 1 is a schematic diagram of a system including a laser beam irradiation nozzle and a shield gas injection water expulsion mechanism for use in a water environment according to an embodiment of the present invention.

Embodiment 1:

With reference to FIG. 1, the system configuration of submerged laser beam irradiation equipment and its water expulsion mechanism according to one embodiment of the invention will be described more in detail in the following.

A submerged laser beam irradiation nozzle 1 is supported by a travelling stage 2 having a lift. The laser beam irradiation nozzle 1 is comprised of a mirror tube 3, a shield gas nozzle 4 which represents a first nozzle, a water expulsion nozzle 5 which represents a second nozzle, a shield gas shutter 6 serving as a closure means, and a constant load support mechanism 7, which operates as a support means for press supporting the laser beam irradiation nozzle 1 against the surface 8 to be processed with an appropriate load. A shield gas and a water expulsion gas are supplied from a gas supply source 11 through a pressure control unit 12 and via a shield gas pipe 13 and a water expulsion pipe 14, respectively.

When the laser beam irradiation nozzle 1 is moved from the atmosphere and immersed into water, shutter 6 provided at a front end of shield gas nozzle 4 is closed, and at the same time, a shield gas is filled inside the nozzle 4 to prevent water intrusion thereinto. The pressure of the shield gas is controlled so as to increase according to the depth of the nozzle in the water. When the laser beam irradiation nozzle 1 is set at a specified position, it is pressed by the constant loading support mechanism 7 against the surface 8 under an appropriate load. Then, a gas is injected from the water expulsion nozzle 5 at a constant pressure so as to maintain a constant distance between the tip of the nozzle and the irradiation surface, and, since a gas phase region is formed locally as a result, the shield gas shutter 6 is opened to cause an inert gas to flow. At the same time, a laser beam is transmitted via an optical fiber 10 from laser oscillator 9 to carry out welding or surface reform processing. This process is controlled remotely via a control panel 15.

Figure 2:
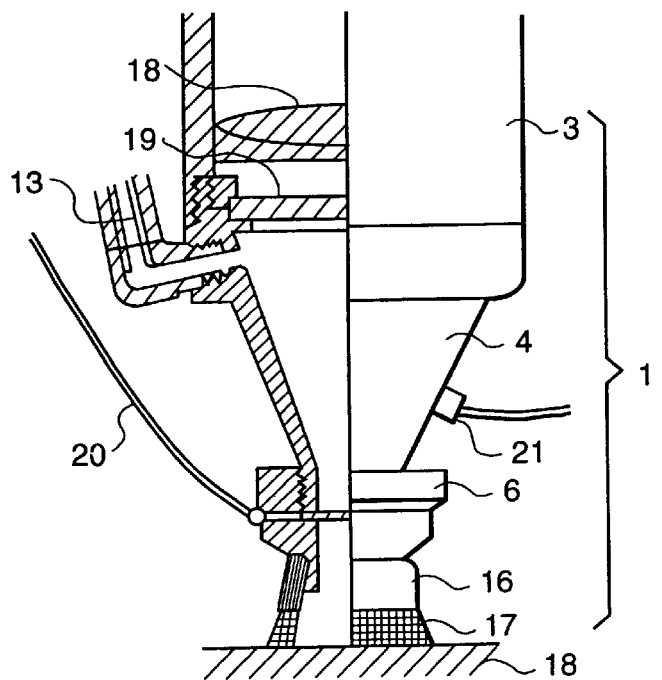
FIG. 2 is a cross-sectional side view in part of a laser beam irradiation nozzle of the invention.

FIG. 2 illustrates a cross-sectional view of a nozzle unit of the invention. As shown in FIG. 2, focus lens group 18 is housed inside mirror tube 3, and in front of the focus lens there is provided a protection glass 19, the inside of the mirror tube being sealed thereby so as to isolate it from a portion of the shield gas nozzle 4 and the shield gas.

To the side of the base of the shield gas nozzle 4 there is coupled a shield gas pipe 13 through which there is admitted a shield gas, such as dry argon gas. The shield gas admitted therein is directed so as to impinge on the surface of the protection glass 19 to remove any water film, droplets or foreign matter present thereon. By way of example, dried argon gas is used in this instance, however, the invention is not limited thereto, and any other inert gas can be applied to obtain the same effect. A pressure sensor 21 for detecting the water depth is attached to the side of the shield gas nozzle 4, at the front end of which there is further provided a shutter 6 and a metal cup 16, which supports a water curtain 17 made of a metal wire brush. Shutter 6 can be opened remotely by a release mechanism 20 serving as an opening means.

In this combination of components arranged as described above, while laser beam irradiation nozzle 1 is being moved to a submerged position where laser beam processing is to be conducted, shutter 6 is closed and a shield gas is supplied via shield gas pipe 13 into the shield gas nozzle chamber 4 to prevent water intrusion thereinto by action of the gas pressure. When the nozzle 1 reaches the submerged position where it is desired to carry out laser beam processing, the water curtain 17 is brought into water-tight contact with the surface of the workpiece which is to be irradiated, and then shutter 6 is opened via release mechanism 20. At the same time, an appropriate gas flow of the shield gas is allowed to flow. This appropriate gas flow of the shield gas is at a pressure set by the pressure control unit 12 in accordance with the water pressure detected by the pressure sensor 21. By supplying the shield gas in the manner described above, water expulsion within water curtain 17 is accomplished effectively in a few seconds. Determination of the appropriate gas flow also depends on the quality of the water curtain, such as the brush density and its contacting condition with the surface to be processed.

The quality of a submerged laser beam weld provided by the above-mentioned arrangements was found to be substantially the same as that in the atmosphere. Further, in a range of water depth from 20 cm to 30 meters, good welding results have been obtained with a small consumption of shield gas of around 20 1/min. Further, substantially the same result has been obtained using inflammable felt, fabric or chemical fabrics as water curtain 17.

Figure 3:
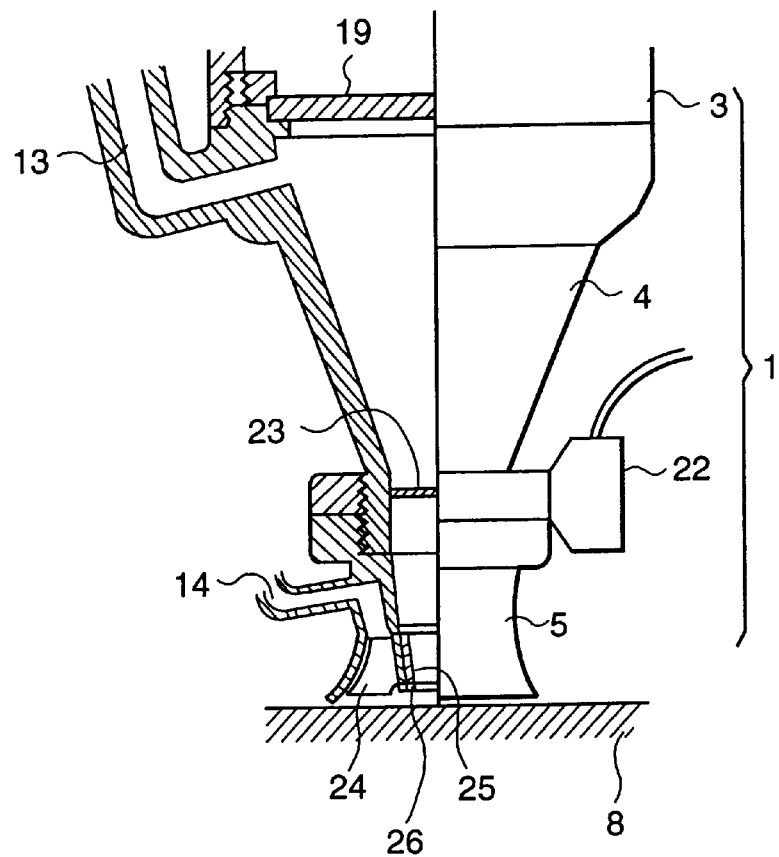
FIG. 3 is a cross-sectional side view in part of another laser beam irradiation nozzle of the invention.

Embodiment 2:

FIG. 3 is a cross-sectional side view of a laser beam irradiation nozzle 1 forming a second embodiment of the invention, which differs from the first embodiment only in that it has a different closure mechanism and a different water expulsion mechanism at the front end of the nozzle.

Namely, in the front end of the shield gas nozzle 4 there is attached a seal plate 23 to serve as a closure means which is actuated by an electromagnetic switch 22, which serves as closure actuating means, and a water expulsion nozzle 5. Further, a blade runner 24 is coupled rotatably to this water expulsion nozzle 5, being supported via bearing 25 and support ring 26. Further, a water expulsion gas pipe 14, which serves as a second gas supply means for supplying a water expulsion gas, is connected to the water expulsion nozzle 5. Injection of a gas from the water expulsion gas pipe 14 causes the blade runner to rotate at a high speed. The gas flow rate to be supplied into the shield gas nozzle 4 and the gas flow rate to be supplied into the water expulsion nozzle are controlled optimally so as to be independent of each other.

In this aspect of the second embodiment of the invention, while laser beam irradiation nozzle 1 is being moved to a submerged laser beam processing site, sealing plate 23 is closed, and an appropriate gas pressure is maintained within shield gas nozzle 4 similar to the first embodiment. When the laser beam irradiation nozzle 1 reaches the laser beam processing site, its water expulsion nozzle 5 is placed opposite to the surface of the workpiece 8 with an appropriate gap therebetween. In this second embodiment, this gap is set at 1 mm or less. After the laser beam irradiation nozzle 1 is set as indicated above, water expulsion gas is injected from the water expulsion gas pipe 14 at an appropriate flow rate. Thereby, blade runner 24 is caused to rotate at a high speed, thereby expelling water in the vicinity thereof. Then, sealing plate 23 is opened by the electromagnetic switch 22 to permit the shield gas to flow therethrough and a laser beam to pass therethrough.

This water expulsion nozzle 5 having blade runner 24 consumes more injection gas; however, it is advantageous in that water expulsion becomes more effective and easier, and since there was no direct contact between the nozzle and the surface being processed, nozzle travel is smooth, and the quality of welds obtained is excellent.

Although the blade runner is provided on the outer circumference of the water expulsion nozzle in this embodiment, it also may be provided on the inner circumference thereof. Further, the runner may be provided inside or outside of the water curtain in the first embodiment of the invention to attain the same effect.

Figure 4:
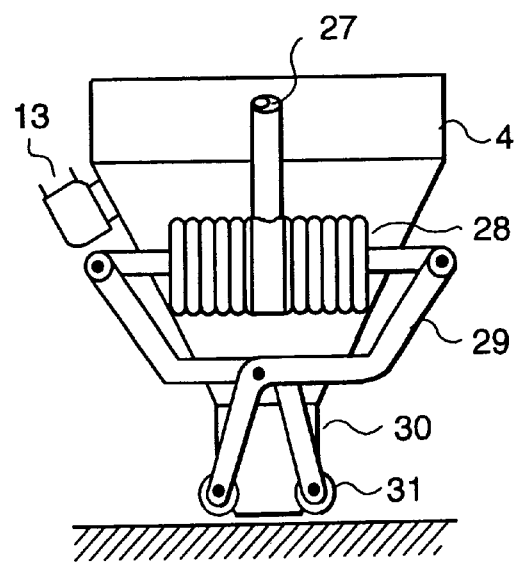
FIG. 4 is a cross-sectional side view of a structure of a laser beam irradiation nozzle of the invention.

Embodiment 3:

FIG. 4 is a side view of a shield gas nozzle 4 according to a third embodiment of the invention, for use instead of the laser beam irradiation nozzles 1 of the first and the second embodiments, in which the other components and arrangements are the same as in the first and the second embodiments.

In this third embodiment of the invention, a nozzle front end of a shield gas nozzle 4 is comprised of elastic body 30, and a shield gas pipe 13 and a working gas pipe 27 serving as an opening mechanism are connected to the shield gas nozzle 4 and a bellows cylinder 28 respectively. By causing the working gas to flow in the working gas supply pipe 27 at the same time when the shield gas flows, the bellows cylinder 28 is caused to expand according to the gas pressure of the working gas admitted therein simultaneously with the flow of the shield gas, thereby operating a lever 29 which has a link mechanism, which releases two constraining (or gripping) plates 31 from the elastic body 30 at the front end of the nozzle. On the other hand, when the supply of the shield gas is stopped, bellows cylinder 28 contracts to cause the two gripping plates 31 to grip the elastic body 30 at the nozzle front thereby to prevent water intrusion therethrough. These operations are controlled to take place in synchronism with the timing of start and stop operation of the laser beam irradiation. Control of these operations is executed through manipulation of the control panel 15.

In this embodiment of the invention, the closure means is provided by the nozzle comprised of elastic member 30, and the closure actuating means is comprised of bellows cylinder 28, lever 29, constraining plates 31 and working gas pipe 27.

Figure 5:
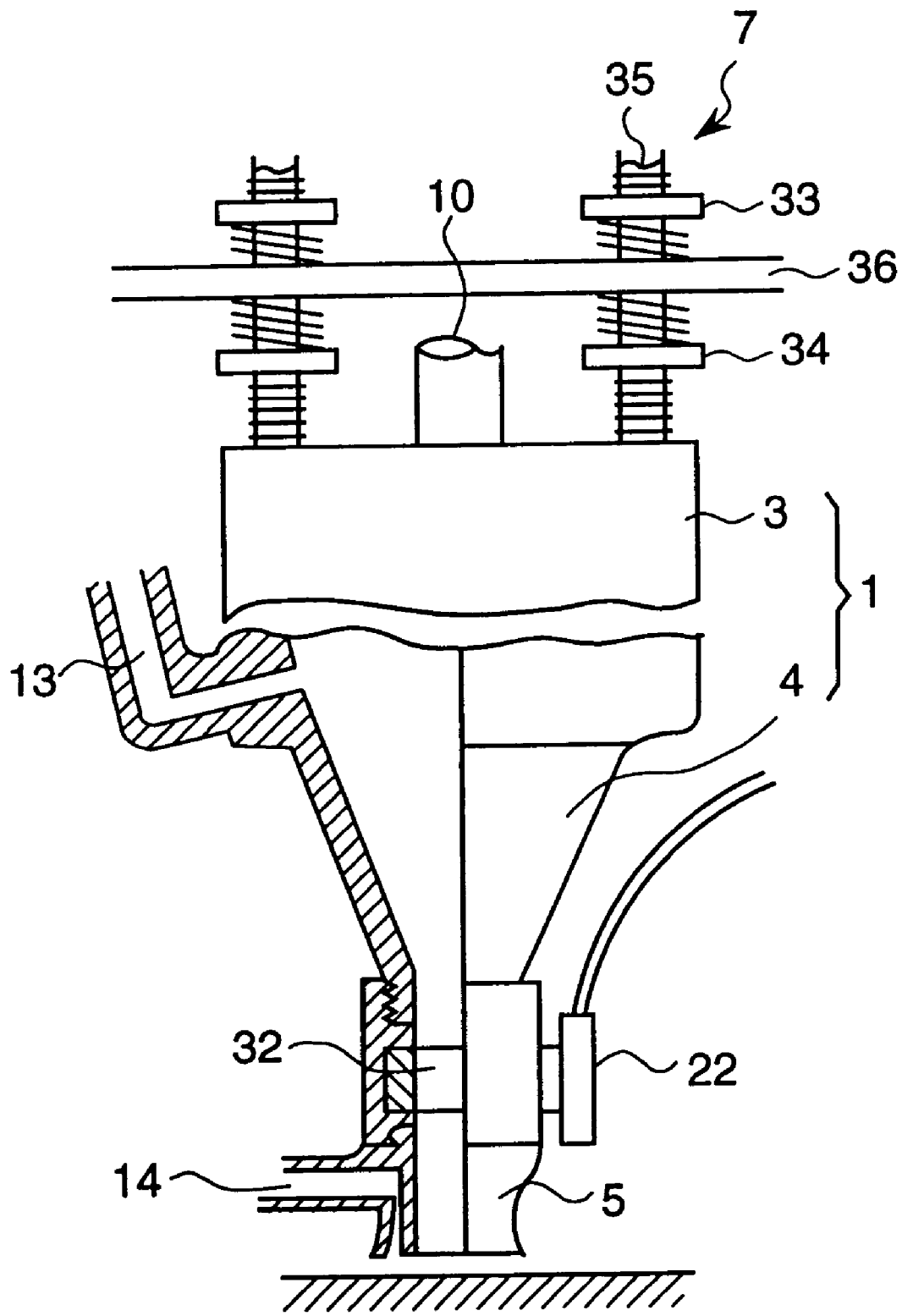
FIG. 5 is a cross-sectional side view in part of a laser beam irradiation nozzle structure of the invention.

Embodiment 4:

FIG. 5 is a side view of a shield gas nozzle 4 and its support mechanism according to a fourth embodiment of the invention, in which there are provided a closure means, which functions by rotation of a round bar, instead of the water expulsion nozzle of the second embodiment, a support mechanism to support the laser beam irradiation nozzle using springs, and an exhaust port for the water expulsion gas pipe located at the front end of the water expulsion nozzle. The other components and arrangements are the same as in the second embodiment.

In this fourth embodiment of the invention, round bar 32 has a hole (not shown) penetrating from one side to the other side thereof in a direction perpendicular to its axial length. A communicative state to allow a gas flow through the hole is selectable by rotating the round bar 32 by 90 degrees using the electromagnetic switch 22. When the hole is closed, the opening of shield gas 4 is closed by the round bar 32 itself, and when the hole is opened by rotating the bar by 90 degrees, a laser beam, as well as a shield gas from the shield gas pipe 13, are allowed to pass through the hole, the latter being ejected from the water expulsion nozzle 5. Thereby, gas ejections both from shield gas pipe 13 and water expulsion gas pipe 14 will ensure a localized water expulsion from the surface to be processed. The diameter of the hole provided in the round bar 32 is adequate if it is large enough at least to allow the laser beam to pass therethrough, however, it is preferable for the diameter of the hole to be the same as the inner diameter of the nozzle or larger. Therefore, the diameter of the round bar 32 is also designed preferably to have sufficiently a larger diameter than the inner diameter of the nozzle.

Further, although laser beam irradiation nozzle 1 is comprised of a plurality of components and has a substantial weight, the laser beam irradiation nozzle 1 tends to bounce back from the surface of the workpiece 8 by the force of the gases which are ejected at a high speed from the shield gas pipe 13 and water expulsion gas pipe 14. Therefore, the laser beam irradiation nozzle 1 is coupled elastically to a support plate 36 via a support column 35, spring adjusting screw 33 and load adjusting spring 34, which in combination constitute a constant loading support mechanism 7, wherein the spring load of the load adjusting spring 34 is adjusted to reduce the load of the water expulsion gas pressure required to balance with the substantial weight of the nozzle, thereby to minimize the quantity of the water expulsion gas being supplied.

Figure 6:
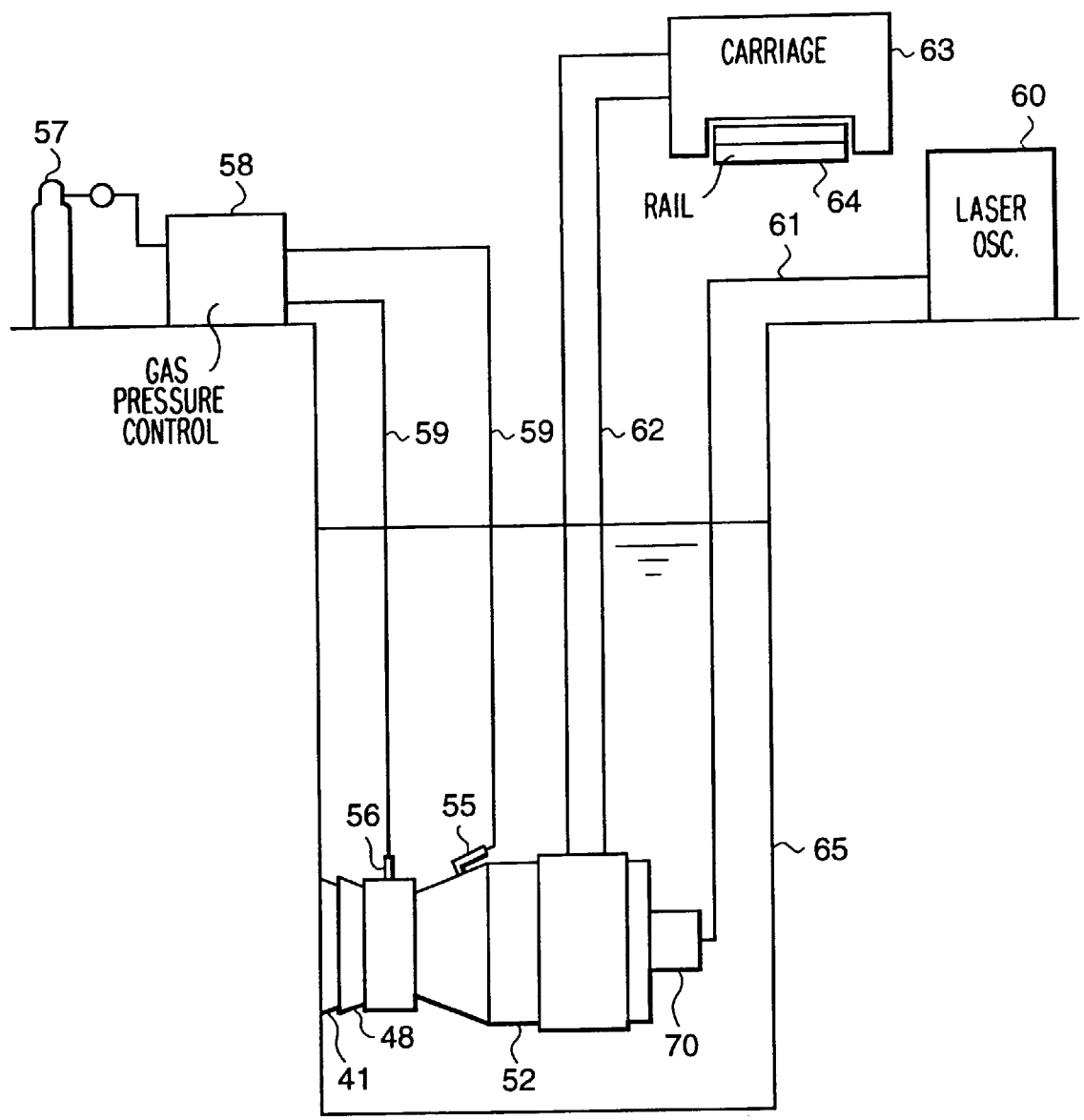
FIG. 6 is a schematic diagram depicting laser beam irradiation equipment having a shield gas injection nozzle for use in a water environment.
Figure 8A:
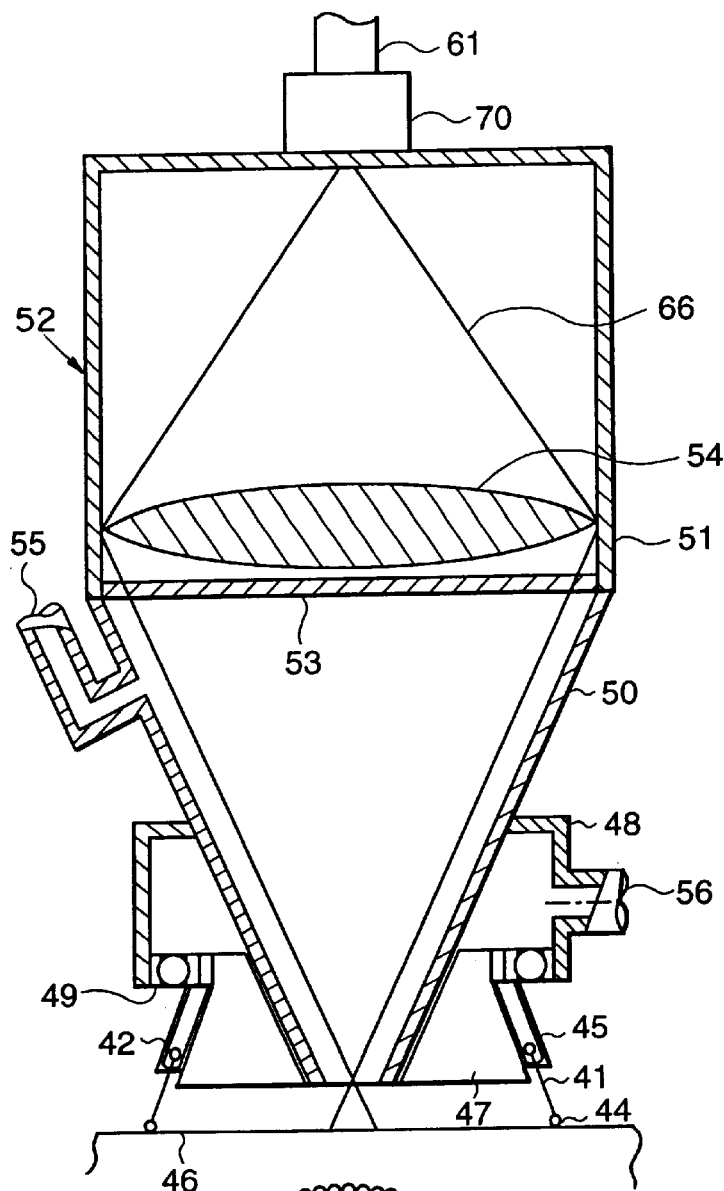
FIG. 8(a) is a longitudinal section view.
Figure 8B:
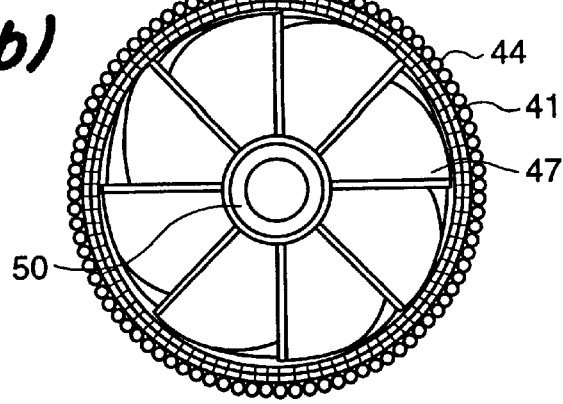
FIG. 8(b) is an end view depicting laser beam irradiation optical components.

Embodiment 5:

A laser beam irradiation equipment for use in water according to a fifth embodiment of the invention has the same nozzle structure as that of FIG. 6. FIG. 8(a) is a schematic diagram indicating a laser beam irradiation optical components assembly. Laser beam irradiation optical component assembly 52 is comprised of a laser beam irradiation tube 51, which includes a focus lens 54, a conical tube 50 in which laser beam 66 focuses, and a shield gas injection nozzle 48.

Laser beam 66, transmitted through optical fiber 41 into mirror tube 51, is focused by focus lens 54 in conical tube 50 and is irradiated on the surface 46 of a workpiece. A protection glass 53 isolates the chamber of the conical tube 50 in a water-tight manner from the chamber of the laser beam irradiation tube 51. In the case of a localized water shielding, water may flood into the chamber of the conical tube 50 when the laser beam irradiation optical head 52 is submerged into a water vessel 65 to be set at a position opposite to the surface 46 to be processed, however water immersion into the chamber of the laser beam irradiation tube 51, which would cause deposition of water droplets on the lens, can be prevented by this protection glass 53.

After water submersion of the nozzle, a center gas and a shield gas are forced to flow so as to expel water from the chamber of the conical tube 50. Proper arrangement of a center gas supply port 55 in a manner to allow its gas flow to impinge on the surface of the protection glass 53 will make it possible to remove water droplets on the glass and dry the surface thereof. Further, it is also possible to prevent water intrusion into the chamber of the conical tube 50, from the start of the lowering of the laser beam irradiation optical component assembly 52, from the atmosphere into the water, by continuously ejecting the shield gas and the center gas.

Shield gas injection nozzle 48 is comprised of a shield gas supply port 56, a frame 42 for accommodating a plurality of thin wires 41, bearing 49 and a runner 47. The frame 42 has a spreading end portion slanted outwardly at an angle of 20 degrees. This slanting angle ensures jumping movement of the plurality of thin wires 41 in response to the centrifugal force of rotation toward the irradiation surface and also prevents bending of the tip portions of the thin films toward the inside of the shield gas injection nozzle 48 when the same is caused to travel in an opposite direction.

Frame 42 is supported by shield gas injection nozzle 48 via the bearing 49 at its upper portion. Runner 47 is disposed so that there is a gap with the outer surface of the conical tube 50 to ensure a smooth rotation therebetween, however, it is mechanically in contact with the inner surface of the frame 42. Thereby, when a shield gas is supplied through shield gas supply port 56, runner 47 rotates, thereby rotating only the frame 42 holding the thin wires 41.

Each of thin wires 41 is made of a metal wire having a diameter of 0.4 mm, and has a spherical protrusion 44, 45 at each end thereof. Protrusion 45, which is inside of the frame, is provided to prevent the thin wire from jumping out of the casing of frame 42, and so its shape is more important, while the other protrusion 44 on the other end, which comes in contact with the surface 46, has a heavier weight than that of protrusion 44. Thereby, it becomes possible to promote the jumping movement of thin wires in response to the centrifugal force of rotation, to provide a flexible contact with the surface 46 having irregularities by the provision of the spherical protrusion, and to remove foreign matter, such as the scale of oxides, efficiently and smoothly.

Figure 9:
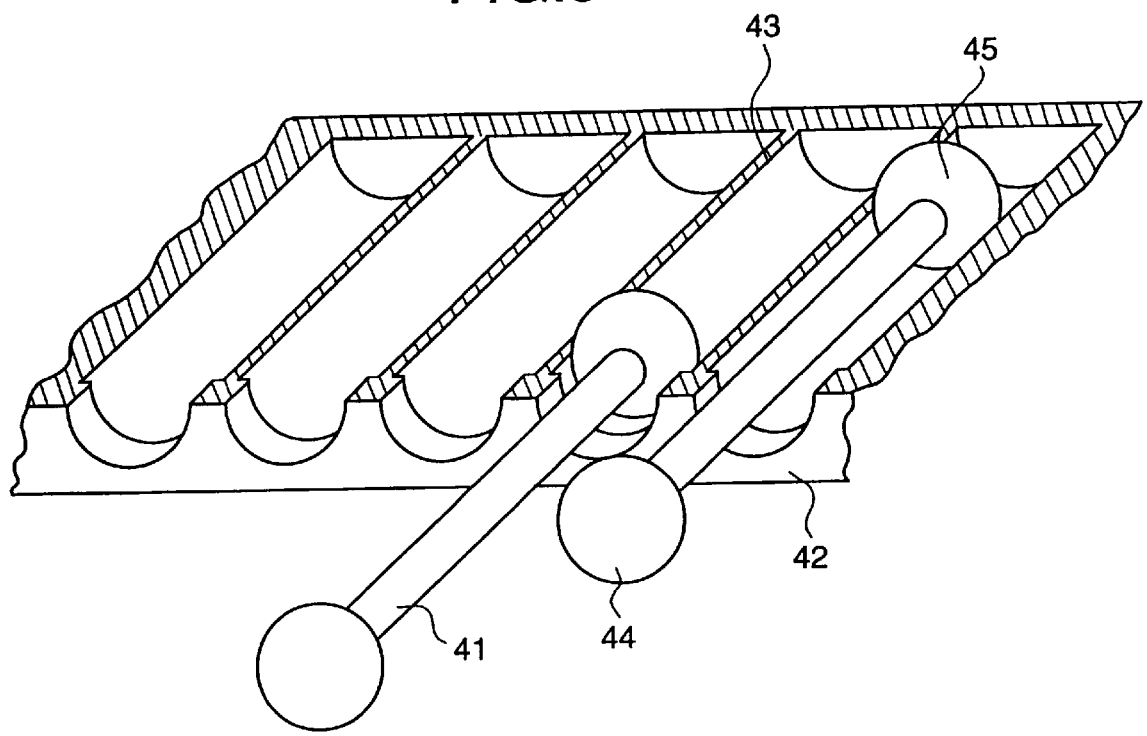
FIG. 9 is a schematic diagram depicting a circumferential arrangement of a plurality of thin wires on a circumference of the shield gas injection nozzle of the invention.

FIG. 9 depicts an arrangement of the thin wires 41 in a circumferential direction of rotation. In order to prevent bending of thin wires 41 due to rotation, grooves 43 are provided in the circumferential direction on both sides of frame 42 for holding respective thin wires 41 therein, each thin wires 41 having a protrusion 45, the shape of which is a polyhedron, whereby the whole thin wire 41 is prevented from swinging in the circumferential direction. Provision of grooves 43 prevents mutual interference between protrusions 45 while they are caused to move up and down in the axial direction of the grooves, thereby ensuring a smooth up and down movement of the thin wires 41.

Figure 7:
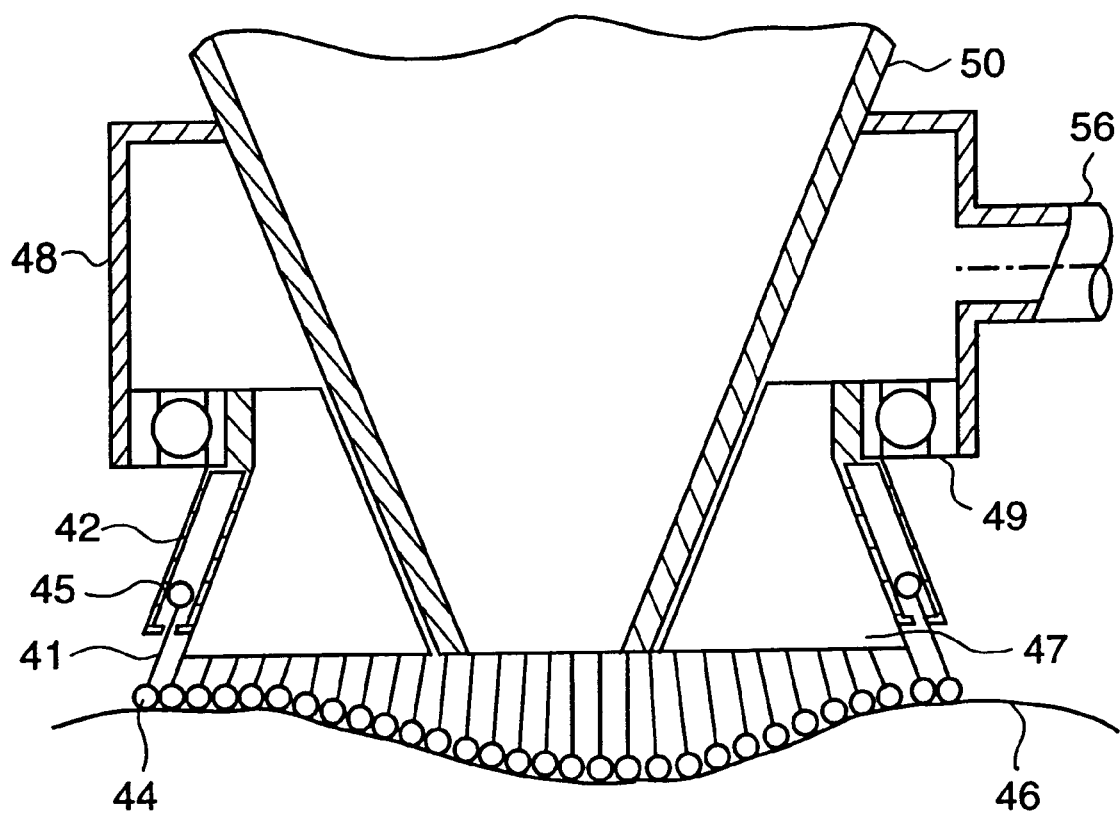
FIG. 7 is a schematic diagram depicting a shield gas injection nozzle according to the invention.

With reference to FIG. 7, movement of the thin wires 41 in contact with an irregular surface 46 is illustrated. Since each thin wire 41 is arranged independently, it can move in contact with any irregular profile of the irradiation surface.

Figure 10:
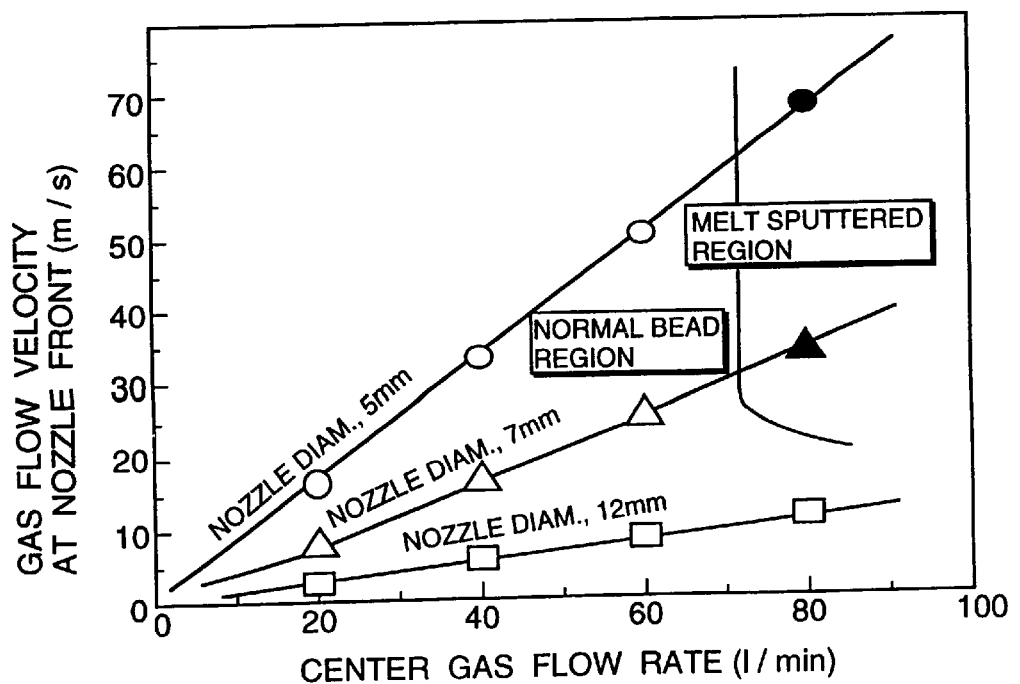
FIG. 10 is a diagram indicating a relationship among shield gas flow quantity, flow rate and surface conditions of laser beam irradiation beads.

In this embodiment of the invention, the quantity of shield gas being supplied increases, since runner 47 must be rotated by the shield gas. FIG. 10 indicates relationships of a center gas velocity at the front end of the conical tube 50 relative to a center gas flow rate and of a surface condition of a laser beam irradiated bead surface. A nozzle having a smaller diameter end on the conical tube 50 will provide a faster flow velocity thereat when its gas flow rate increases. However, a larger diameter nozzle end will not be able to provide a faster velocity, even if the gas flow rate is increased.

In a range from 5 mm to 7 mm for the diameter at the nozzle end, and with a gas flow rate up to 60 1/min, a normal bead by laser beam irradiation is obtainable. However, when the gas flow rate is increased, for example, to 80 1/min, a laser beam irradiated bead is caused to sputter, thereby preventing the formation of a normal bead. With a 12 mm diameter at the nozzle end, even at a gas flow rate of 80 1/min, a normal bead is obtainable. Therefore, also with respect to the flow rate of the shield gas which flows outside the center gas, if it does not exceed a limit flow rate of the center gas, a normal laser irradiated beam can be obtained. Thereby, the shield gas flow rate here is defined to be 60 1/min or less.

Figure 11:
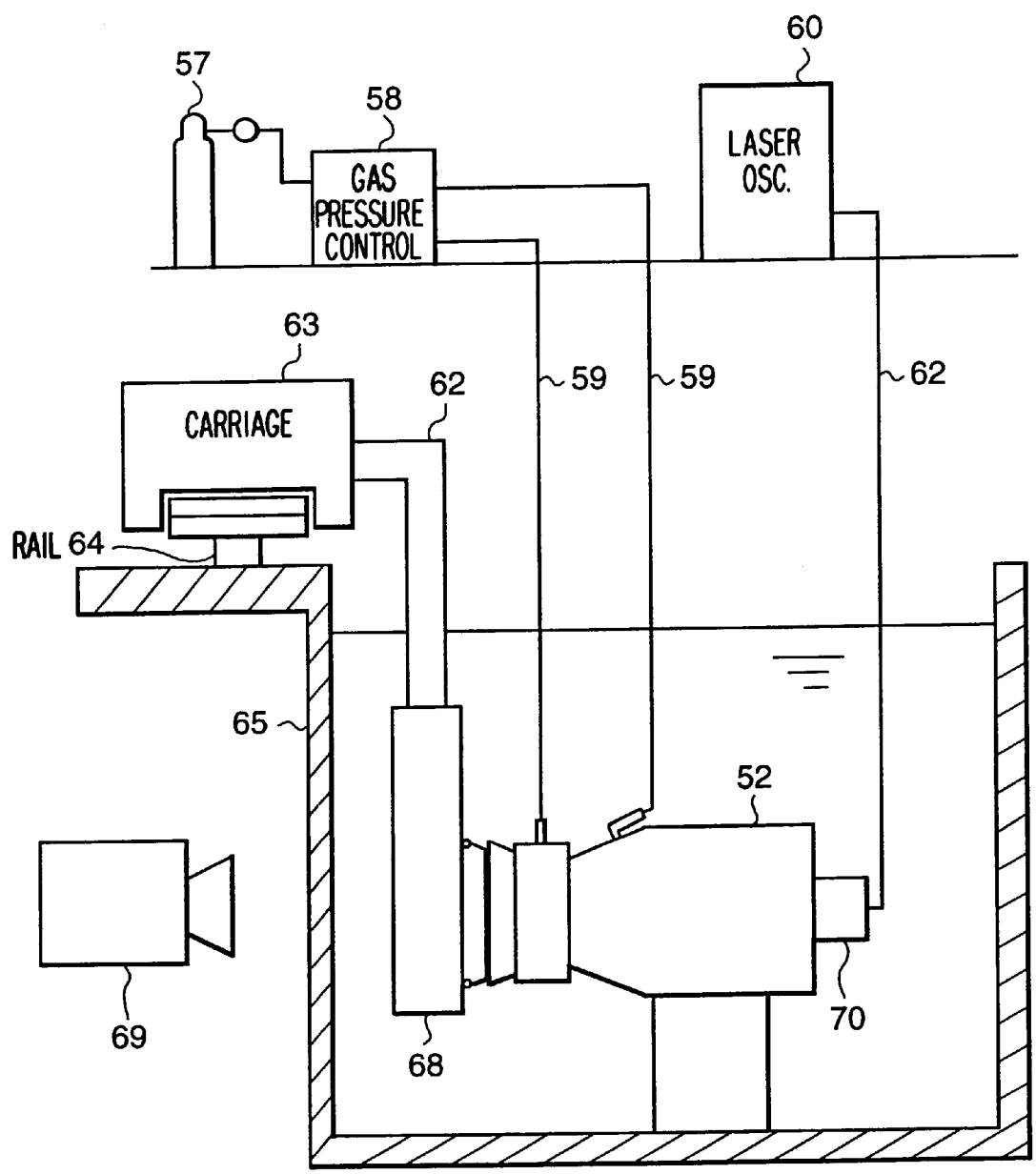
FIG. 11 is a schematic diagram of test equipment for use for confirming a water expulsion condition in a water environment.

In FIG. 11, there is shown equipment for determining the shield gas flow rate and the water expulsion state in a condition in which a constant center gas flow is supplied. In a water tank 65 made of a transparent material there is submerged a laser beam irradiation optical component assembly 52, having shield gas injection nozzle 48, and a transparent plate 68 disposed in front of the nozzle 48 and serving as a laser beam irradiation surface. Provision of the transparent plate 68 enables observations of water expulsion performance and water immersion occurrence through use of a camera 69 disposed outside the water tank 65 and opposite to the laser beam irradiation optical assembly.

In this arrangement for testing the invention, in which camera 69 and laser beam irradiation optical assembly 52 are fixed, transparent plate 68 is supported movably by a traveling carrier 63, thereby simulating the traveling state of the laser beam irradiation optical component assembly 52. A groove in the shape of a cross is provided in the surface of the transparent plate 68 to simulate a surface irregularity, and the water expulsion effect produced by the nozzle head when it passes over the groove is confirmed.

Figure 12:
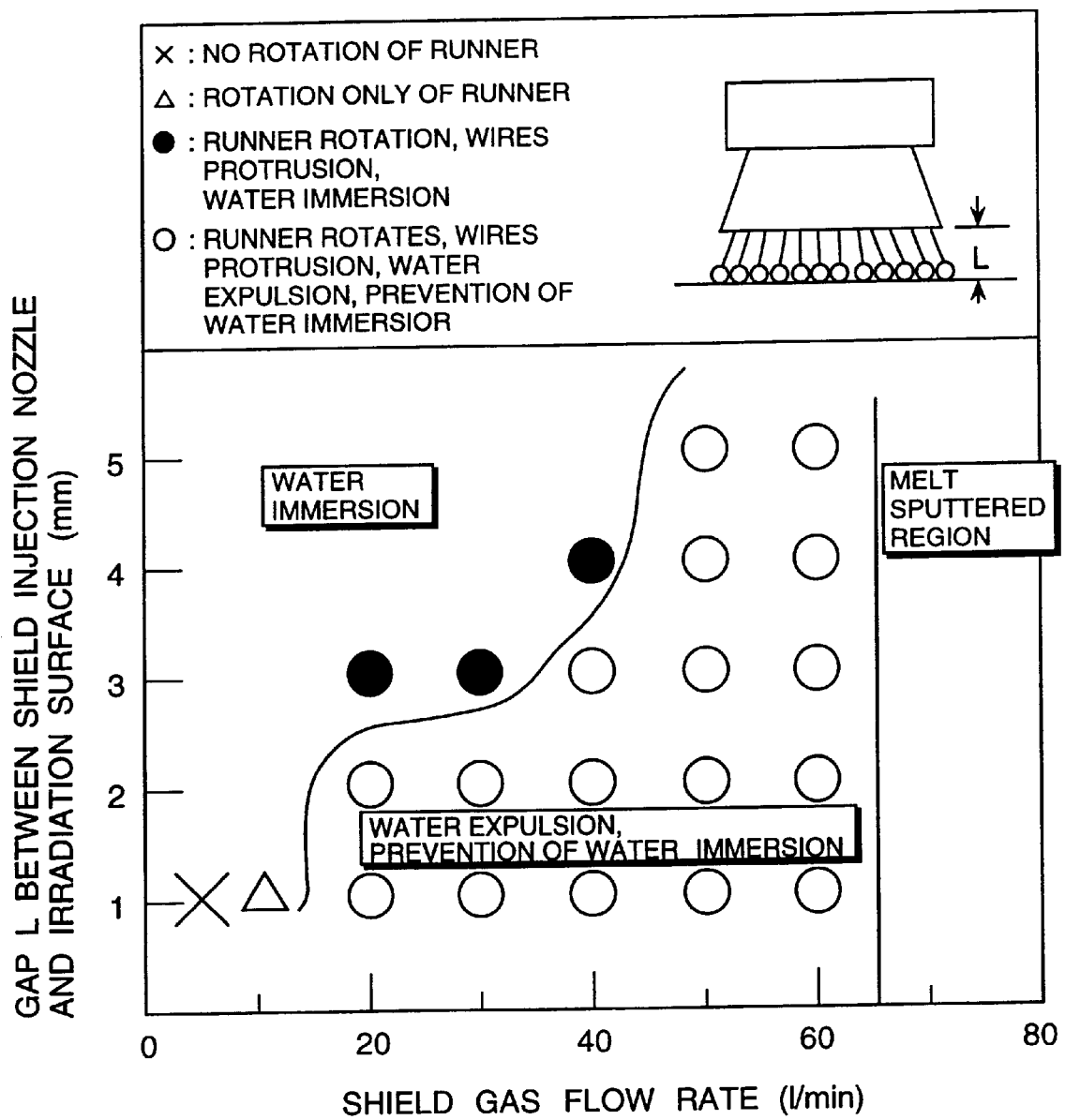
FIG. 12 is a diagram indicating a relationship between a gap between the shield gas injection nozzle and an irradiation surface of a workpiece, and water expulsion conditions.

FIG. 12 indicates a gap L between the injection nozzle 48 and the irradiation surface 46 and a contacting state of the thin wires 41 with the surface 46, as simulated using the transparent plate 68. The traveling speed of the transparent plate 68 was set at a constant value optimal for laser beam irradiation, using the gap L and the shield gas flow rate as parameters. Tests were conducted using the equipment of FIG. 8(a). By changing the position of the shield gas injection nozzle 48, gap L was adjusted appropriately, and the contacting state of the thin wires with the surface of transparent plate 68, as well as the water expulsion state, were monitored visually.

With a flow rate of the shield gas at 5 1/min, runner 47 did not rotate. At a flow rate of 10 1/min, the runner 47 started to rotate, but the rotation was not sufficient to cause the thin wires 41 to be projected outside the frame into contact with the surface of a workpiece. A shield gas flow rate of 20 1/min or more did cause the thin wires 41 to project and contact the surface of transparent plate 68 by action of the centrifugal force of rotation, thereby enabling water expulsion and prevention of water intrusion. However, when the gap L became larger than 3 mm, water intrusion could not be prevented, thereby failing to provide a perfect water-tight shielding.

Gap L was changed in a range from 1 mm to 5 mm as a parameter. For each value of the gap, a shield gas flow at 50 1/min or more provided water expulsion and water intrusion prevention, thereby ensuring effective water expulsion and water intrusion prevention to be carried out, and a normal bead to be obtained by laser beam irradiation at a shield gas flow rate in a range from 50 1/min, thereby to the limit flow rate to below that which causes molten metal sputtering, which is at or above 60 1/min. When the attitude of the nozzle was changed during the tests, the result was a difference in the gas flow rates, however, when an adequate gas flow was supplied, satisfactory water expulsion and water intrusion prevention effects as required by the invention could be obtained.

Figure 13:
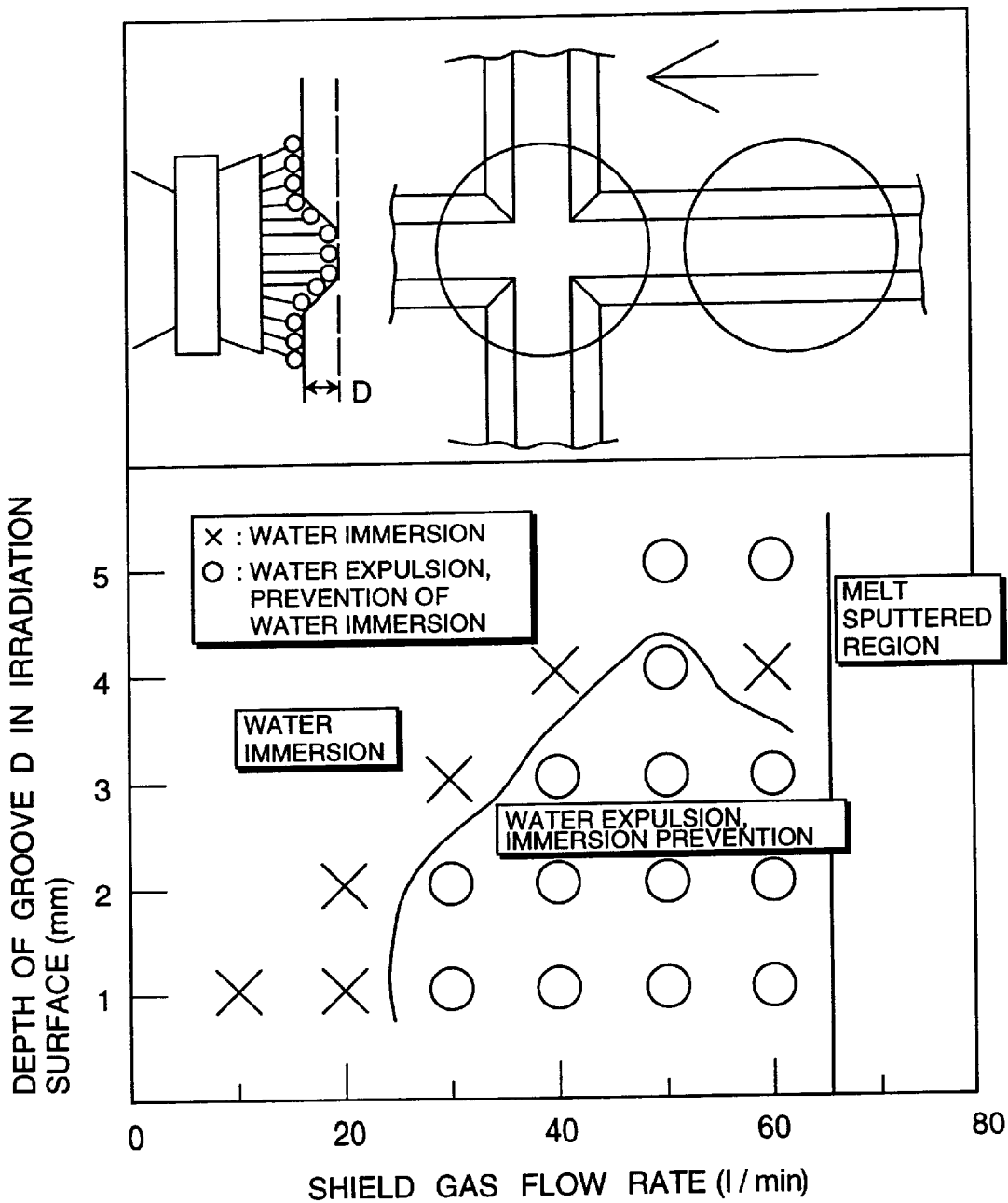
FIG. 13 is a diagram depicting water expulsion conditions by the shield gas injection nozzle on an irradiation surface having irregularities, such as grooves.

FIG. 13 depicts water expulsion conditions on irradiation surface 46 having a groove, with respect to various shield gas flow rates and a constant center gas flow. The traveling speed of the transparent plate 68 was set at a constant value optimal to laser beam irradiation, and an irregularity in the irradiation surface was simulated by providing a groove therein having a width of 10 mm on the surface of the transparent plate 68, wherein the depth D of the groove and a shield gas flow rate were changed as parameters. Shield gas injection nozzle 48 was positioned in the center of the groove, then was moved along the groove until it passed over a cross point of the grooves to determine whether or not water intrusion through the gap was observable.

It was possible to expel water from a groove having a depth up to 2 mm at a shield gas flow rate of 30 1/min or more, and water expulsion and water intrusion prevention from a groove having a depth up to 4 mm could be achieved at a shield gas flow of 50 1/min. However, at a shield gas flow of 60 1/min, water intrusion was observed when the nozzle 48 passed over the cross point of the grooves having a depth of 4 mm or more. Thereby, a preferred shield gas flow rate for use in this embodiment was set at 50 1/min.

FIG. 14 is a diagram indicating another embodiment of the invention, in which laser beam irradiation equipment for use in a submerged environment has the same basic structure as shown in FIG. 7. FIG. 14 depicts a structure of a shield gas injection nozzle at the front end of a laser beam irradiation tube of the invention. A laser beam irradiation optical component assembly 52 is comprised of a laser beam irradiation tube 51 which houses a focusing lens 54 therein, a conical tube 50 in which laser beam 66 is focused, and a shield gas injection nozzle 48.

Laser beam 66, which is transmitted through optical fiber 61 into tube 51, is focused by focus lens 54 in conical tube 50 to focus the beam on the surface 46 of a workpiece to be irradiated. Protection glass 53 isolates the chamber of the laser beam irradiation tube 51 in a water-tight manner from the chamber of conical tube 50. In the case of a localized shielding, there occurs water intrusion until laser irradiation optical head 52 is placed opposite to the surface 46 in the water vessel 65. Thereby, the protection glass 53 is provided to isolate the chamber of laser beam irradiation tube 51 and prevent water droplets from forming on the focus lens housed therein.

After positioning the assembly 52 in water, water in the chamber of the conical tube 50 is expelled by injection of the center gas and the shield gas. By disposing the center gas supply port such that the center gas supplied therefrom impinges on the surface of the protection glass 53, it becomes possible to effectively remove water droplets thereon and dry the surface of the protection glass. Further, it is also possible to prevent water intrusion into the chamber of the conical tube 50 from the start of immersion of the laser beam irradiation optical assembly 52 from atmosphere into water by a continuous injection of the shield gas and the center gas.

At the front end of the conical tube 50 there is fixed a shield gas injection nozzle 48, which is comprised of a shield gas supply port 56, a runner 47 which holds a plurality of thin wires 41, and bearing 49.

Figure 14A:
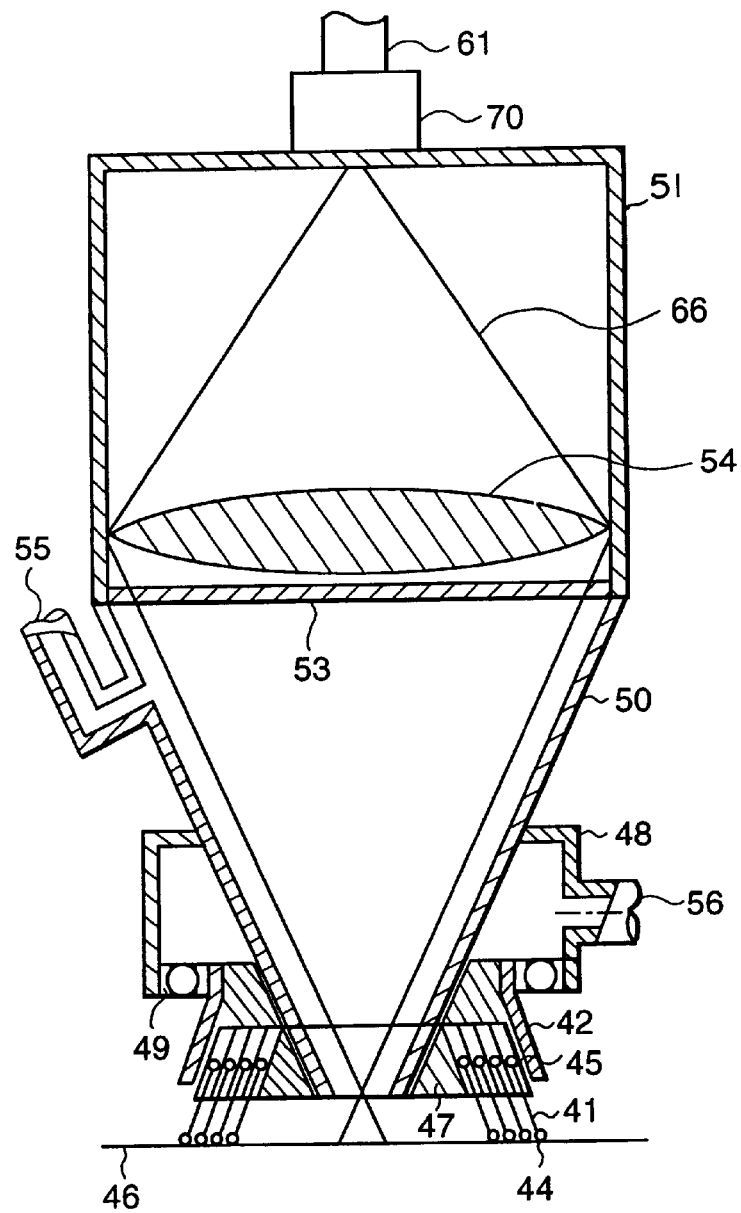
FIG. 14(a) is a longitudinal sectional view.
Figure 14B:
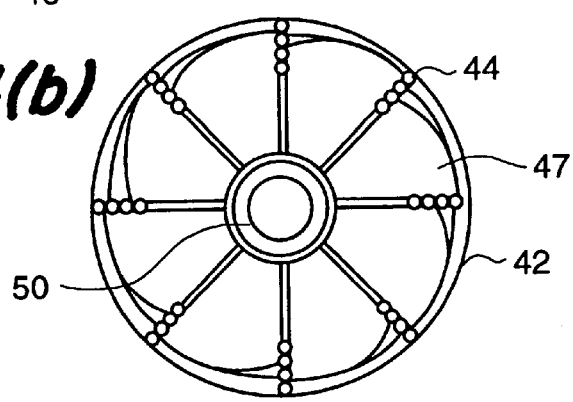
FIG. 14(b) is an end view of a structure of a shield gas injection nozzle coupled to the front end of a laser beam irradiation tube.
Figure 15:
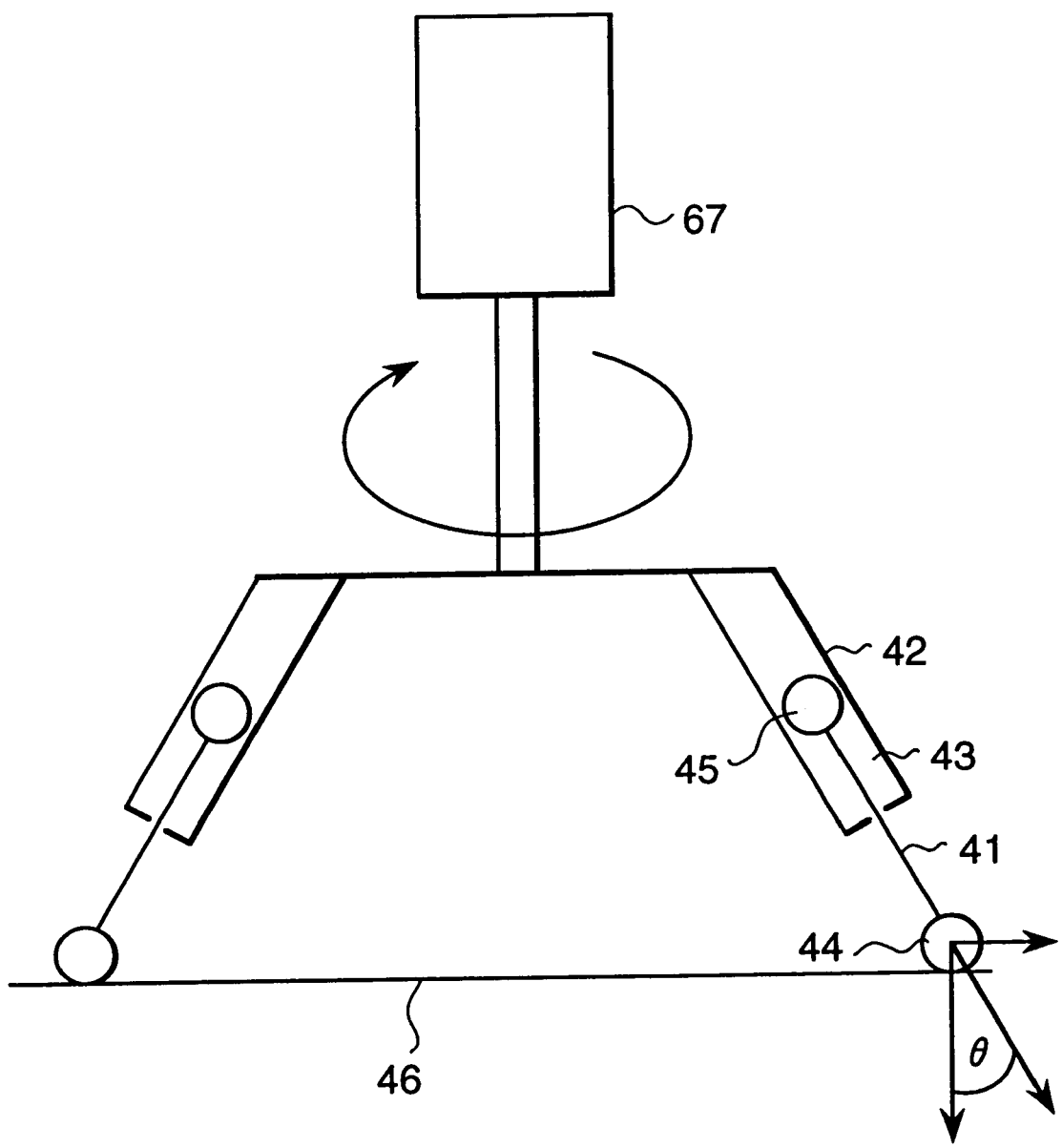
FIG. 15 is a schematic diagram illustrating the principle of the shield gas injection nozzle of the invention.

The runner 47, which holds the plurality of thin wires, has a structure as indicated in FIGS. 14(a) and 14(b), wherein the plurality of thin wires are caused to protrude in response to a centrifugal force of rotation. The runner 47 is supported by the shield gas injection nozzle 48 via bearing 49. Since the plurality of thin wires 41 are rotated by the runner 47 which is rotated by injection of the shield gas, and are pressed on the surface 46 of the workpiece to be irradiated by the centrifugal force of its rotation, it becomes possible to shield a gap present between the shield gas injection nozzle 48 and the irradiation surface 46. Although the gap between each blade in the runner is not shielded, since the plurality of thin wires 41 are arranged around the circumference of the runner, water intrusion through the gap between each blade can be prevented by the flow of the shield gas.

Figure 16:
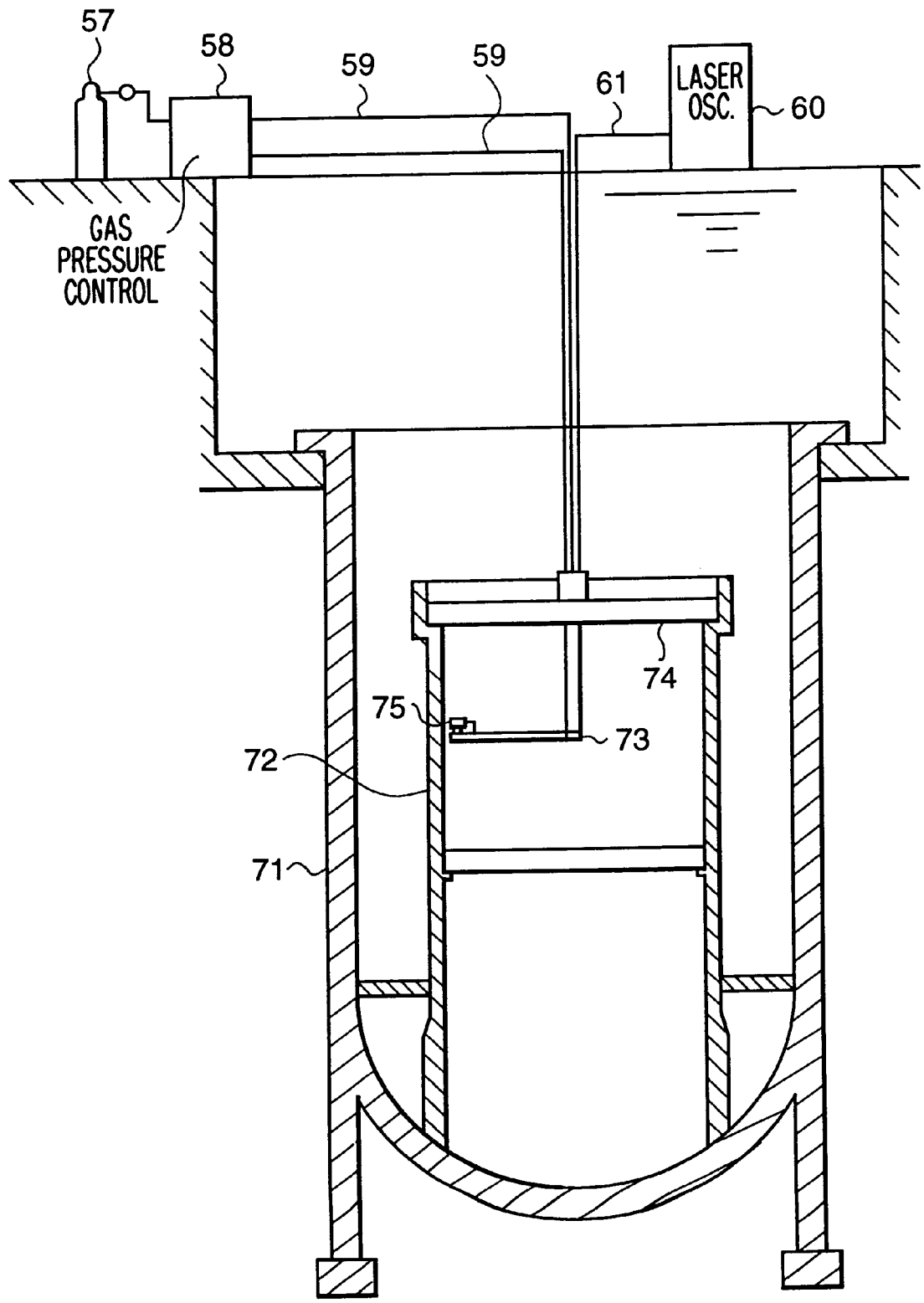
FIG. 16 is a cross-sectional inside view of a nuclear pressure vessel at rest and under a submerged laser beam irradiation processing, with its upper cover and fuel assemblies removed.

FIG. 16 illustrates an example of submerged laser beam machining according to this embodiment of the invention, as applied to the structure of a nuclear reactor, in particular, to its shroud. FIG. 16 is a cross-sectional view of a reactor vessel 71 at rest under laser beam irradiation machining with its upper pressure cover and fuel assemblies removed. A gas supply source 57, pressure control unit 58 and laser beam oscillator 60 are disposed on the operation floor.

An arm 72 carrying a laser beam irradiation optical unit 52 has a joint 73 which allows access to an internal wall of the shroud 72. The arm is disposed in the center of the shroud 72 so as to travel up and down. After passing through an upper lattice plate 74, the arm is bent by 90 degrees by joint 73, and then approaches a specified site for machining on the inner surface of the shroud. The movement of laser beam irradiation optical unit 52 is controlled by rotation of arm 62, which is rotated by a motor 67 disposed in the upper portion thereof, and in dependence on the rotation angle and the length of the arm, the laser beam irradiation velocity is controlled. Upon confirmation that the laser beam irradiation unit 52 is set in the proximity of a welding site 75 on the inner surface of the shroud, a shield gas is injected.

Since the inner surface of the shroud is deposited with the scale of oxides, it is preferable to remove such scales prior to laser beam irradiation by moving the shield gas injection nozzle backward in the opposite direction to the normal travel direction of laser beam irradiation at least by a distance of one half of a diameter of the circumference of a plurality of the thin wires, and pausing for a predetermined period while injecting the shield gas. Then, after removal of the scale, the nozzle head is returned to its initial position to start its assigned laser beam irradiation. The time required for removing the scale of oxides at the starting point of irradiation corresponds to the time required for water expulsion from the chamber of the nozzle. Alternatively, it is also possible from the start to position the nozzle head in a backward direction from the start point of irradiation at least by one half the diameter of the circumference of the thin wires in order to remove the scale of oxides.

Figure 17:
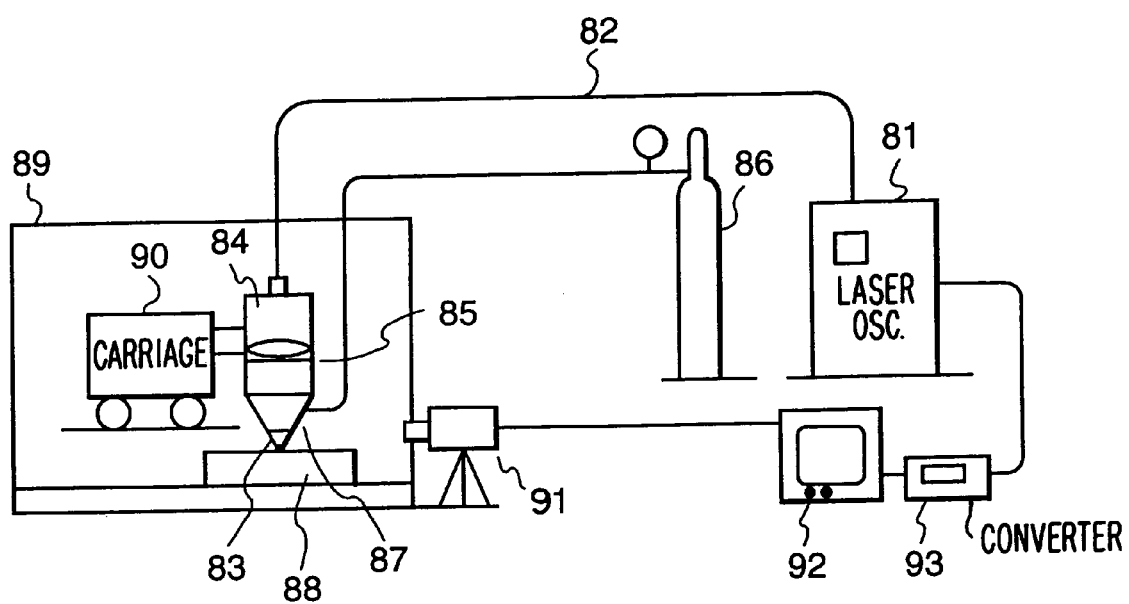
FIG. 17 is a diagram of laser beam machining equipment used in an embodiment of the invention.

Embodiment 6:

FIG. 17 is a diagrammatic view of YAG laser irradiation equipment representing a sixth embodiment of the invention. A laser beam from a YAG laser (hereinafter simply referred to as a laser), which is excited in a YAG laser oscillator 81, is transmitted through an optical fiber 82 to a mirror tube 84, in which the laser is focused by a focus lens 85 and is emitted as a laser beam 83 from an opening of a shield gas nozzle 87, having its focus point at a predetermined position in the vicinity of the surface of a workpiece 88 to be irradiated. The mirror tube 84 and nozzle 87 are coupled to a traveling table 90 in a machining chamber 89, in which irradiation processing is executed. Through nozzle 87 there are supplied a shield gas and a process gas, such as He, Ar and the like, according to its object, from a gas supply source 86. Irradiation conditions are monitored via a TV camera 91 and a monitor TV 92. At the same time, the optical signal being monitored is converted in a converter 93 to an electric signal and is fed back to the laser oscillator 81.

Figure 18:
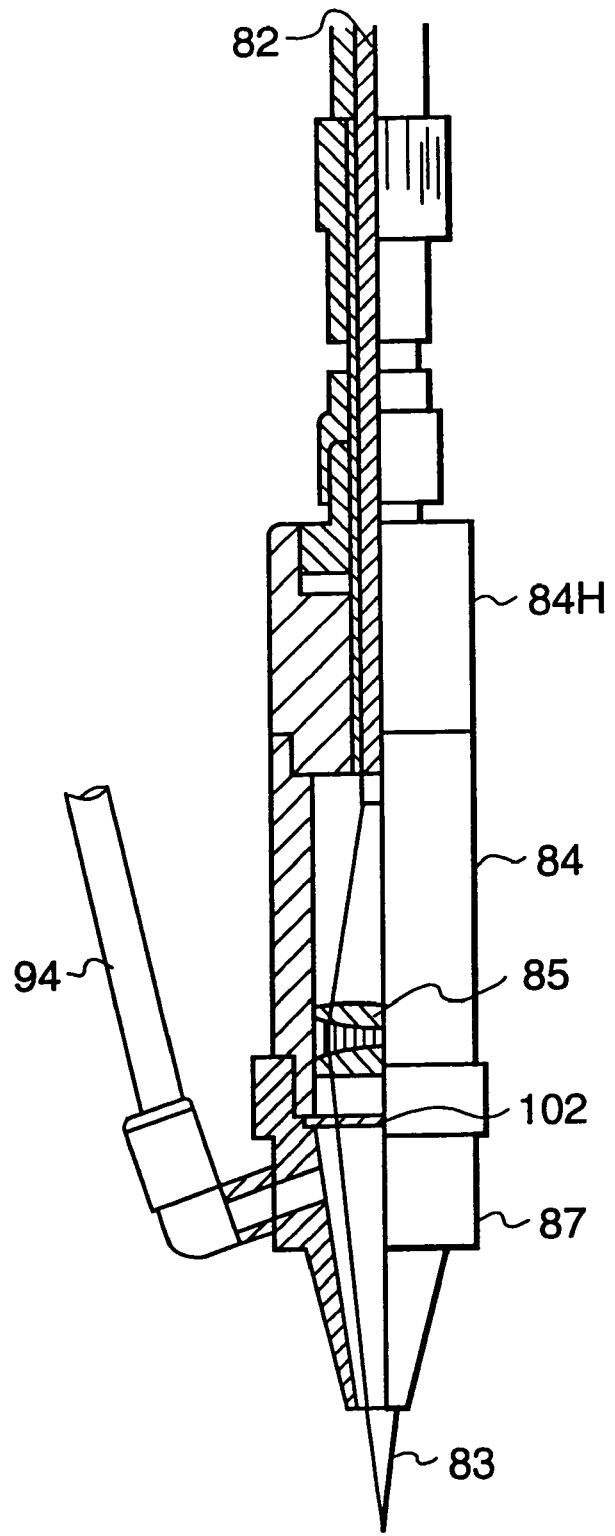
FIG. 18 is a cross-sectional side view of a mirror tube and a nozzle member of a laser beam irradiation unit as used in the embodiment of FIG. 17.

FIG. 18 is an enlarged, partial cross-sectional, side view of one example of a laser beam irradiation assembly according to the invention. Optical fiber 82 is fixed to an optical fiber support member 84H, which is integral with mirror tube 84. This optical fiber support member 84H is made of an aluminum alloy, which is optically opaque, however, it is not limited thereto, and may be made of a transparent material. In this sixth embodiment of the invention, mirror tube 84 was made of transparent glass, and nozzle 87 was made of a transparent acryl resin, which is easy to process. Further, for comparison, samples of mirror tube 84 made of aluminum alloy and nozzle 87 made of copper alloy were also prepared. The diameter of the mirror tube was 150 mm. Tests were conducted using this laser beam irradiation equipment, and workpieces made of stainless steel SUS 304 were subjected to laser beam irradiation for 60 sec using a multi-mode, continuous wave, at an output of 900 W, and a velocity of movement of 10 mm per sec. A shield gas, which is Ar gas in this embodiment, is supplied through a shield gas piping 94 and is injected in nozzle 87 and therefrom at a flow rate of 20 1/min to impinge on the surface of nonreflective transparent glass 102, which protects focus lens 85. The shield gas is supplied to prevent oxidation of molten metal at a focal point of the laser beam 83.

Figure 19:
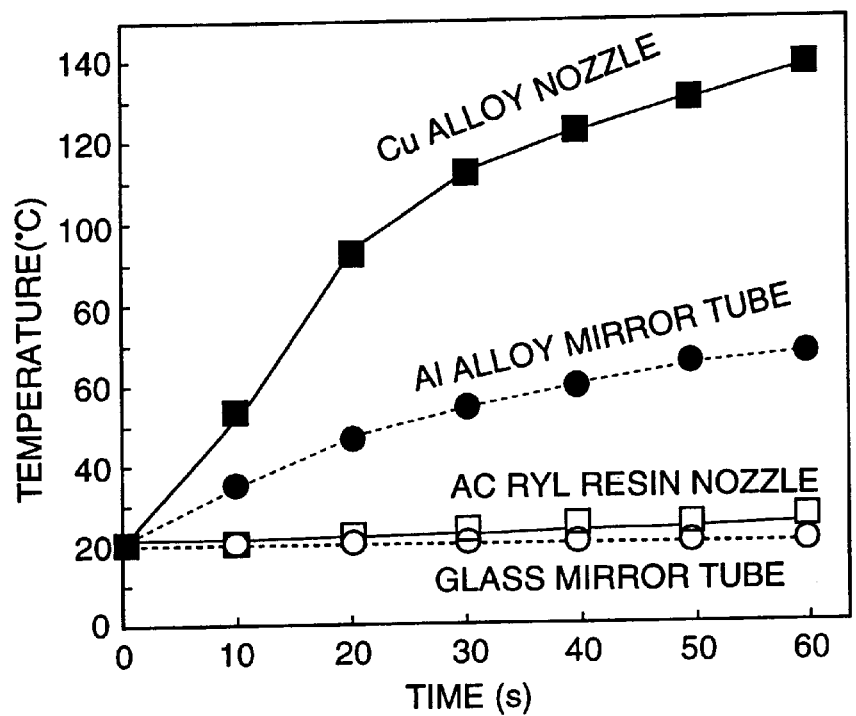
FIG. 19 is a graph depicting a relationship between irradiation time and temperature rise in the mirror tube and nozzle member.

FIG. 19 depicts a relationship between the exposure time and the temperatures of the mirror tube and the nozzle member. Mirror tube 84, made of aluminum alloy which is optically opaque, started to increase its temperature simultaneously with the start of laser irradiation, and its temperature became 68° C. after 60 seconds. However, the temperature at the same position of a mirror tube made of a transparent glass did not show any substantial change from the 20° C. temperature existing prior to the start of laser exposure. Further, the temperature in the center of the nozzle 87, when it is made of copper alloy, which is opaque, rose to 138° C. in 60 seconds after start of irradiation; however, when using a nozzle made of a transparent acryl resin, it only rose to 25° C. Thereby, use of transparent materials was confirmed to be very effective to prevent overheating of the laser beam irradiation components.

Figure 20:
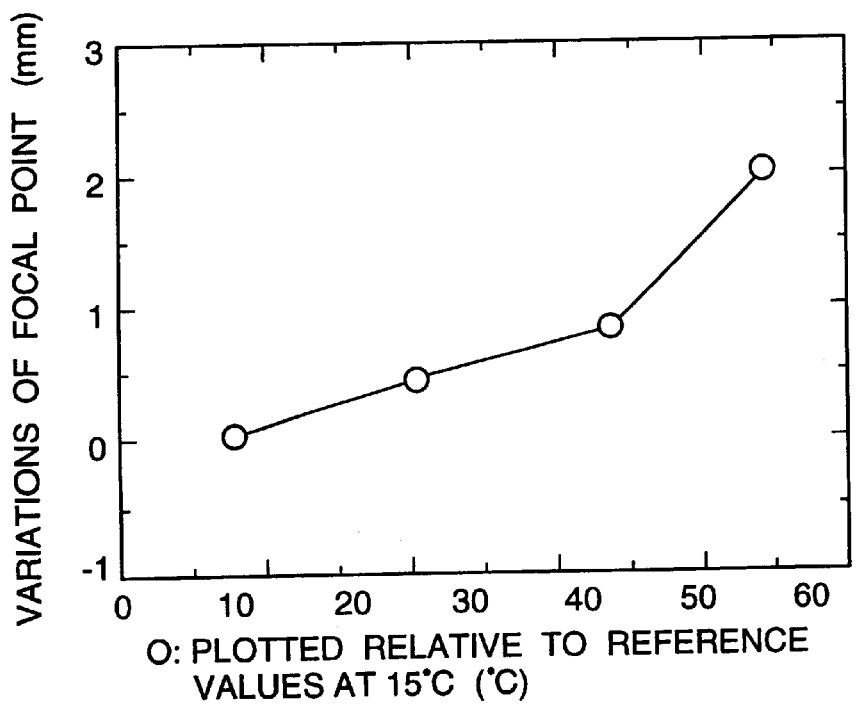
FIG. 20 is a diagram depicting changes in focal point due to temperature rise in the mirror tube.

FIG. 20 indicates variations of the focal point of a laser beam in the direction of laser irradiation due to temperature changes in the mirror tube. At a temperature 68° C. of the focal point of the mirror tube changed about 0.8 mm. Even such a small change in the focal point resulted in a large change in diameter of the laser beam irradiation spot on the surface of workpiece. Further, it is difficult in practice to fabricate a mirror tube which has the same thermal expansion coefficient in all directions. Thereby, since its thermal expansion coefficient is not distributed evenly, the focal point of a laser beam will change in directions perpendicular to the direction of the laser irradiation with increasing temperatures of the mirror tube. Due to such variations in the focal point, in the case of laser beam welding, the resultant weld beads become irregular, and in the case of laser cutting, the cutting precision degrades.

A glow phenomenon occurs due to reaction of the shield gas with a laser beam and due to exothermic radiation from molten metal. When this glow phenomenon takes place in a dark chamber 89, it can be clearly observed through a transparent nozzle via TV camera 91 and monitor TV 92. In the case of laser beam irradiation components made of opaque materials, only an exothermic radiation from a molten metal at the nozzle front can be observed partially.

Embodiment 7:

A seventh embodiment of the invention has a laser beam irradiation component of the same form as that of the sixth embodiment, wherein its mirror tube 84 is made of an aluminum alloy which is optically opaque, and its nozzle 87 is made of an acryl resin which is optically transparent. AS a result of laser irradiation on the surface of a workpiece made of stainless steel SUS 304 using a multi-mode continuous waveform at 600 W output power at a travel speed of 10 mm/sec for 60 seconds, the temperature in the mirror tube 84 made of opaque materials slightly increased to 25° C., however, the temperature in the center portion of the nozzle 87 remained substantially the same at the 15° C. temperature existing prior to laser irradiation. If the output power is small, provision only of a shield gas injection nozzle made of a transparent material can be very effective to prevent overheating of the laser beam irradiation components. Further, a luminous phenomena due to laser irradiation taking place in the nozzle could be monitored clearly, as in the sixth embodiment. Still further, if there occurs no substantial temperature rise in the nozzle portion, only a small part thereof need be replaced with a transparent material, so that a laser luminous phenomenon can be monitored therethrough.

Embodiment 8:

An eighth embodiment of the invention has been prepared similar to the seventh embodiment of the invention, in which only nozzle 87 was made of glass and quartz glass, and mirror tube 84 was made of an optically opaque aluminum alloy. The nozzle made of glass was coated a non-reflective layer on the inner surface of its nozzle tube. A multi-mode laser, with 900 W output power, produced a continuous wave beam with a travel speed of 10 mm/sec irradiated on a stainless steel SUS 304 material for 60 seconds.

Figure 21:
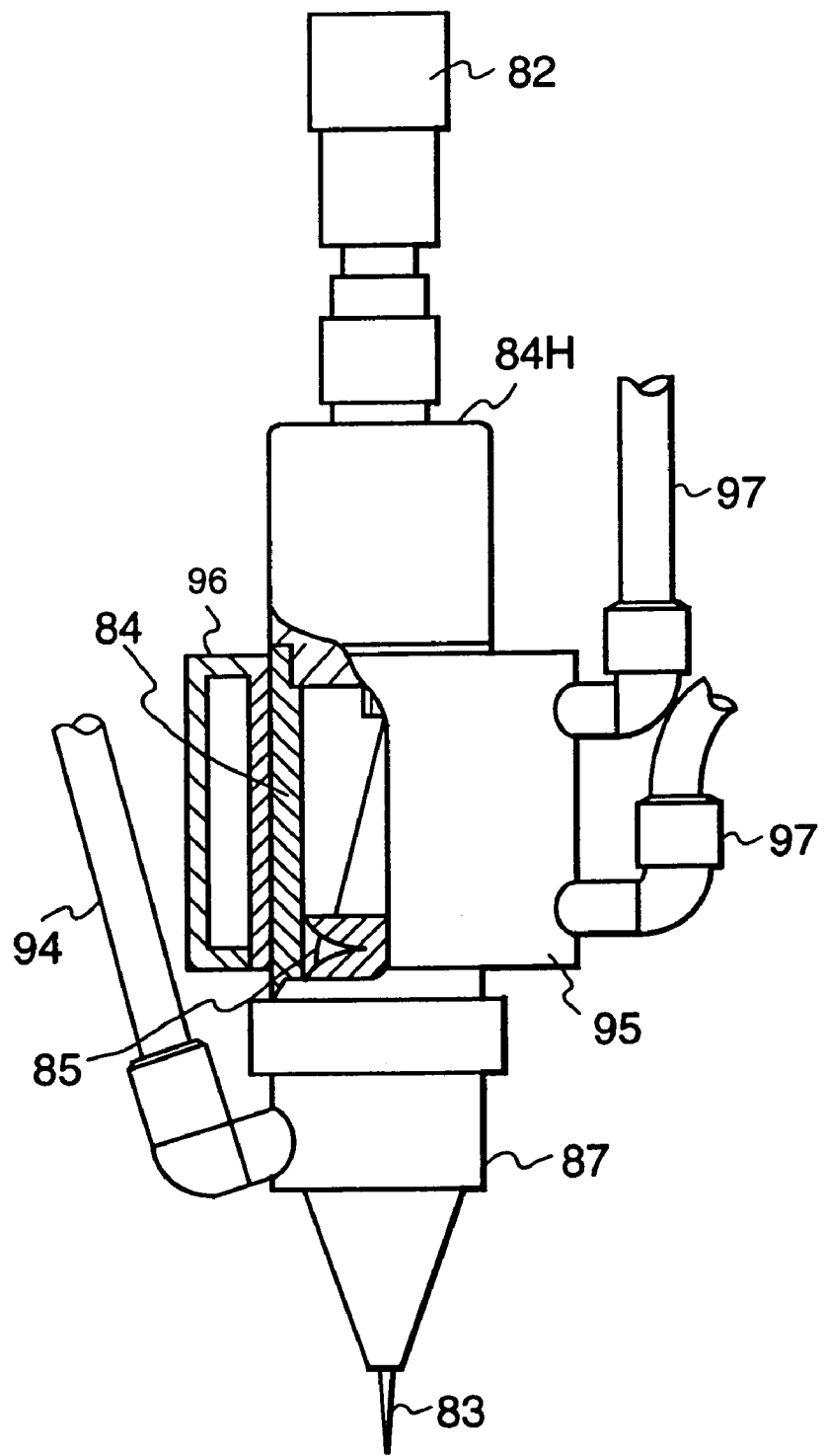
FIG. 21 is a side view partly in section of a laser beam irradiation unit provided with a water cooling unit.

Embodiment 9:

FIG. 21 is a diagram of YAG laser irradiation equipment forming a ninth embodiment of the invention, in which mirror tube 84, made of transparent glass, is provided in part with a cooling jig 95 for preventing overheating, the inner wall 96 of which cooling jig 95 is made of a transparent acryl resin. cooling water piping 97 supplies cooling water to cool mirror tube 84. The outer wall of the jig is made of an aluminum alloy which is optically opaque in order to shield against an excessive laser beam scattering. The nozzle 87 is made of a transparent glass. A multi-mode laser, having a 1200 W output power, produces a continuous wave beam, with a travel speed of 10 mm/sec, which was irradiated on a stainless steel SUS304 member for 120 seconds. In this laser beam irradiation equipment of the ninth embodiment, the temperature rise in its laser beam irradiation components is very small since radiation heat of the laser beam passes through the transparent materials of the mirror tube 84 and the inner wall of the cooling jig 96 and is cooled therein. In addition, there was no temperature rise in the nozzle member, and the luminous phenomenon due to laser irradiation was clearly monitored through the transparent nozzle on a monitor TV. Namely, it was demonstrated by this embodiment that use of a transparent material in the inner wall of the cooling jig is also advantageous for obtaining improvement of the cooling effect according to the invention for a high power, long-duration laser beam irradiation.

Figure 22:
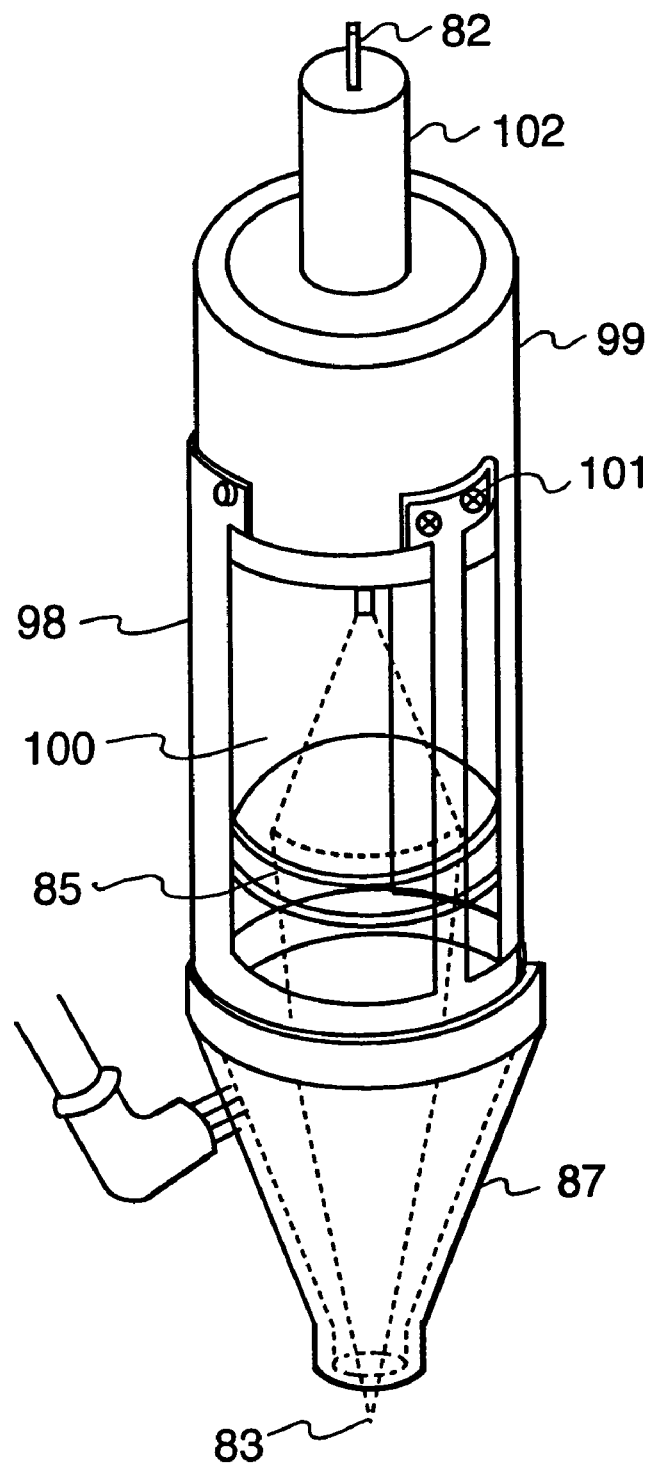
FIG. 22 is a perspective view of laser beam irradiation equipment forming another embodiment of the invention.

Embodiment 10:

In FIG. 22, a tenth embodiment of the invention is illustrated, in which a mirror tube is comprised of cylindrical aluminum frame members 98, 99, and three sheets of quartz glass 100. A laser beam is directed into the mirror tube via an optical fiber through a conduit tube 102. Aluminum frame members 98 and 99 are connected by fastening screw 101. The mirror tube of the tenth embodiment having an arrangement as described above, which is simple in structure, can minimize the cost of manufacture. Further, even if glass having an insufficient strength is used, the aluminum frame can serve as an reinforcement, thereby still providing a structure capable of effecting laser beam irradiation having a sufficient mechanical strength.

What is claimed is:

1. A submerged laser beam irradiation equipment which irradiates a laser beam on a surface of a workpiece submerged within a fluid for processing thereof, comprising:

a lens which focuses a laser beam;

a mirror tube which holds said lens therein;

a first nozzle which is provided on said mirror tube facing the surface of said workpiece subject to irradiation by said laser beam for injecting a shield gas on the surface of said workpiece;

a skirt portion provided at a front end of said first nozzle for preventing water intrusion into said first nozzle, said skirt portion being elastically deformable under pressure against the surface of said workpiece subject to irradiation by said laser beam; and a shutter provided between said skirt member and said mirror tube for preventing water intrusion into a chamber of said mirror tube, said shutter opened during irradiation by said laser beam.

2. A submerged laser beam irradiation equipment according to claim 1, further comprising a sensor for detecting a pressure in said first nozzle; and a pressure control means for controlling a pressure of a gas to be supplied into said first nozzle in response to a pressure detected by said sensor.

3. A submerged laser beam irradiation equipment according to claim 1, wherein said shutter comprises a plurality of blades and an interlocking means for opening and closing said plurality of blades concentrically, whereby during non-irradiation by said laser beam, said plurality of blades are closed to prevent water intrusion using a gas pressure present within said nozzle, and prior to a laser beam irradiation, said plurality of blades are opened with water intrusion being prevented by ejection of a gas.

4. A submerged laser beam irradiation equipment according to claim 1, wherein said shutter comprises:

a round bar having a hole penetrating from one side to an opposite side thereof in a direction perpendicular to an axial line of said round bar, said round bar being disposed in a direction perpendicular to a longitudinal direction of said nozzle end; and said actuating means comprises means for turning said round bar around said axial line thereof, whereby said actuating means rotates said round bar to close said hole during non-irradiation by said laser beam, thereby to isolate the inside of said nozzle from the outside, and prior to irradiation by said laser beam, a pressure of a supplied gas is increased, and simultaneously said round bar is rotated to open said hole, thereby allowing said nozzle to eject a gas to prevent water intrusion.

5. A submerged laser beam irradiation equipment according to claim 1, wherein said shutter comprises a sealing plate which is provided at a front end of said first nozzle and is slidable in a direction perpendicular to a longitudinal direction of said first nozzle; and said actuating means comprises means for sliding said sealing plate in a direction perpendicular to a longitudinal direction of said nozzle, whereby said actuating means causes said sealing plate to close during non-irradiation by said laser beam to prevent water intrusion, and prior to irradiation by said a laser beam causes said sealing plate to open, with a pressure of a supplied gas being increased simultaneously, thereby opening the nozzle end of said first nozzle and ejecting a gas from said nozzle to prevent water intrusion.

6. A submerged laser beam irradiation equipment according to claim 1 wherein of said mirror tube comprises an optically transparent material.

7. A submerged laser beam irradiation equipment according to claim 6 wherein said optically transparent material comprises at least one material selected from a group consisting of glass, quartz glass, quartz and synthesized resin.

8. A submerged laser beam irradiation equipment according to claim 6 wherein said optically transparent material is coated with a non-reflective layer on a surface thereof.

9. A submerged laser beam irradiation equipment according to claim 1 wherein said first nozzle comprises an optically transparent material.

10. A submerged laser beam irradiation equipment which irradiates a laser beam on a surface of a workpiece submerged within a fluid for processing thereof, comprising:

a lens which focuses a laser beam;

a mirror tube which holds said lens therein;

a first nozzle which covers a front end portion of said mirror tube and extends in a direction of irradiation by said laser beam;

a skirt portion provided at a front end of said first nozzle for preventing water intrusion into said first nozzle; and a shutter provided between said skirt member and said mirror tube for preventing water intrusion into a chamber of said mirror tube, said shutter being actuated to open during irradiation by shutter actuating means;

wherein said first nozzle includes a gas supply means;

a further nozzle provided concentrically and integral with said first nozzle at a front end thereof for water expulsion;

a further gas supply means for supplying a gas into said further nozzle;

a support means for press-supporting said first and further nozzles with respect to an irradiation surface of a workpiece with an arbitrary load; and adjusting means for adjusting a pressure and a flow rate of a fluid to be injected from said further nozzle, whereby said adjusting means adjusts the pressure and flow rate of the fluid to be injected from said further nozzle in such a manner as to balance with a supporting pressure of said support means thereby to make it possible to maintain a constant distance between said further nozzle and said irradiation surface of the workpiece.

11. A submerged laser beam irradiation equipment according to claim 10, wherein said further gas supply means is controlled to supply a gas independently of said first gas supply means.

12. A submerged laser beam irradiation equipment which irradiates a laser beam on a surface of a workpiece submerged within a fluid for processing thereof, comprising:

a lens which focuses a laser beam;

a mirror tube which holds said lens therein;

a first nozzle which covers a front end portion of said mirror tube and extends in a direction of irradiation by said laser beam;

a skirt portion provided at a front end of said first nozzle for preventing water intrusion into said first nozzle; and a shutter provided between said skirt member and said mirror tube for preventing water intrusion into a chamber of said mirror tube, said shutter being actuated to open during irradiation by shutter actuating means;

wherein said shutter comprises a shutter nozzle made of an elastic material; and said shutter actuating means comprises a clamp means for closing said shutter nozzle by clamping a front end of said shutter nozzle, whereby said shutter actuating means actuates said clamp means to clamp the front end of said shutter nozzle during non-irradiation by said laser beam to prevent water intrusion, and prior to a laser beam irradiation, said shutter actuating means causes said clamp means to release clamping of the front end of said shutter nozzle in response to the pressure of a gas flow, thereby simultaneously ejecting the gas therefrom to prevent water intrusion.

13. A submerged laser beam irradiation equipment which irradiates a laser beam on a surface of a workpiece submerged within a fluid for processing thereof, comprising:

a lens which focuses a laser beam;

a mirror tube which holds said lens therein;

a first nozzle which covers a front end portion of said mirror tube and extends in a direction of irradiation by said laser beam;

a skirt portion provided at a front end of said first nozzle for preventing water intrusion into said first nozzle; and a shutter provided between said skirt member and said mirror tube for preventing water intrusion into a chamber of said mirror tube, said shutter being actuated to open during irradiation by shutter actuating means;

wherein said skirt portion comprises:

a shield gas injection nozzle disposed to surround an outer circumference of said skirt portion at a front end thereof;

a plurality of thin wires provided at a slanting angle spreading outwardly from said shield gas injection nozzle, each of said plurality of thin wires being capable of sliding in an axial direction; and rotating means for rotating said plurality of thin wires, whereby said rotating means rotates said plurality of thin wires to provide a centrifugal force to each of said plurality of thin wires so that said each of said plurality of thin wires is caused to project toward a laser beam exposure surface of a workpiece to come into contact therewith constantly, thereby ensuring water expulsion and prevention of water intrusion on the laser beam exposure surface of the workpiece immediately below said shield gas injection nozzle.

14. A submerged laser beam irradiation equipment according to claim 13, wherein said rotating means for rotating said plurality of thin wires is provided inside said shield gas injection nozzle, and is rotated by a gas flow of said shield gas.

15. A submerged laser beam irradiation equipment according to claim 13, wherein each of said plurality of thin wires comprises a spheric protrusion at a tip end thereof.

16. A submerged laser beam irradiation equipment according to claim 13, wherein said centrifugal force produced by rotation applied to each of said plurality of thin wires ensures contacting and pressing of the wires against the laser beam irradiation surface, the action of contacting and pressing also serving to remove foreign matter deposited on the irradiation surface, and the injection of a shield gas prevents water intrusion into a space immediately below the shield gas injection nozzle.

17. A submerged laser beam irradiation equipment according to claim 13, further comprising a sensor provided in said shield gas injection nozzle for monitoring water intrusion thereinto, whereby through monitoring of water expulsion and water intrusion on an laser beam irradiation surface immediately below said shield gas injection nozzle, the quality of the laser beam irradiated surface is determined in-situ.

18. A laser beam irradiation equipment having means for generating a laser beam, means for conducting said laser beam to a focus lens, and a laser irradiation mirror tube for supporting said focus lens to cause said laser beam to converge at a predetermined position, wherein at least a part of a sidewall of said laser irradiation mirror tube for supporting said focus lens to converge said laser beam at the predetermined position comprises an optically transparent material.

19. A laser beam irradiation equipment according to claim 18 wherein said laser irradiation mirror tube comprises a shield gas injection nozzle which is provided on the side thereof facing a workpiece, at least a part of said shield gas injection nozzle being comprised of an optically transparent material.

20. A laser beam irradiation equipment according to claim 18, wherein said optically transparent material is provided at least at a tubular part of said laser irradiation mirror tube extending in a direction of laser irradiation.

* * * * *